(12) United States Patent
Laaksonen et al.

(10) Patent No.: US 12,067,992 B2
(45) Date of Patent: Aug. 20, 2024

(54) AUDIO CODEC EXTENSION

(71) Applicant: Nokia Technologies Oy, Espoo (FI)

(72) Inventors: Lasse Laaksonen, Tampere (FI); Kalle Luukkanen, Tuusula (FI); Juha Kallio, Vantaa (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 316 days.

(21) Appl. No.: 17/600,466

(22) PCT Filed: Mar. 19, 2020

(86) PCT No.: PCT/FI2020/050172
§ 371 (c)(1),
(2) Date: Sep. 30, 2021

(87) PCT Pub. No.: WO2020/201620
PCT Pub. Date: Oct. 8, 2020

(65) Prior Publication Data
US 2022/0165281 A1    May 26, 2022

(30) Foreign Application Priority Data
Apr. 2, 2019 (GB) .................................. 1904626

(51) Int. Cl.
*G10L 19/008* (2013.01)
*G10L 19/16* (2013.01)
(52) U.S. Cl.
CPC .......... *G10L 19/008* (2013.01); *G10L 19/173* (2013.01)
(58) Field of Classification Search
CPC ..... G10L 19/008; G10L 19/173; G10L 15/22; G10L 15/02; G10L 15/10; G10L 2015/025; G10L 2015/088; G10L 2015/227; H05B 47/105; G06F 3/016; G06F 3/165
See application file for complete search history.

(56) References Cited

U.S. PATENT DOCUMENTS

| 10,304,458 B1 * | 5/2019 | Woo ........................ G10L 17/02 |
| 10,586,369 B1 * | 3/2020 | Roche ...................... G10L 13/00 |
| 2003/0053634 A1 | 3/2003 | McGrath et al. |
| 2004/0039464 A1 | 2/2004 | Virolainen et al. |
| 2009/0271175 A1 | 10/2009 | Bodin et al. |

(Continued)

FOREIGN PATENT DOCUMENTS

| AU | 2013231030 A1 * | 4/2014 | ............... G06F 3/01 |
| CA | 2792336 A1 * | 9/2011 | ......... G06F 3/04842 |

(Continued)

OTHER PUBLICATIONS

Office action received for corresponding Indian Patent Application No. 202147049623, dated Jun. 16, 2022, 6 pages.

(Continued)

*Primary Examiner* — Mohammad K Islam
(74) *Attorney, Agent, or Firm* — ALSTON & BIRD LLP

(57) ABSTRACT

An apparatus comprising means configured to: receive a primary track comprising at least one audio signal; receive at least one secondary track, each of the at least one secondary track comprising at least one audio signal, wherein the at least one secondary track is based on the primary track; and decode and render the primary track and the at least one secondary track using spatial audio decoding.

20 Claims, 11 Drawing Sheets

(56) References Cited

U.S. PATENT DOCUMENTS

| | | | |
|---|---|---|---|
| 2011/0279635 A1 | 11/2011 | Periyannan et al. | |
| 2012/0082226 A1 | 4/2012 | Weber | |
| 2012/0215519 A1 | 8/2012 | Park et al. | |
| 2014/0350924 A1* | 11/2014 | Zurek | G10L 21/0208 704/231 |
| 2014/0362253 A1* | 12/2014 | Kim | H04N 5/262 367/119 |
| 2015/0088500 A1* | 3/2015 | Conliffe | H04M 9/082 704/235 |
| 2016/0026253 A1 | 1/2016 | Bradski et al. | |
| 2016/0050508 A1 | 2/2016 | Redmann | |
| 2016/0133267 A1 | 5/2016 | Adami et al. | |
| 2016/0170970 A1 | 6/2016 | Lindblom et al. | |
| 2016/0196830 A1 | 7/2016 | Riedmiller et al. | |
| 2016/0225187 A1* | 8/2016 | Knipp | G06F 40/131 |
| 2016/0269712 A1* | 9/2016 | Ostrover | H04S 7/301 |
| 2017/0228026 A1* | 8/2017 | Goslin | A63H 3/28 |
| 2018/0012610 A1 | 1/2018 | Riedmiller et al. | |
| 2019/0028817 A1* | 1/2019 | Gabai | H04R 25/407 |
| 2019/0056908 A1* | 2/2019 | Zabetian | G06F 3/0482 |
| 2019/0132674 A1* | 5/2019 | Vilkamo | H04R 5/04 |
| 2020/0125643 A1* | 4/2020 | Gutierrez | H04L 63/083 |
| 2020/0134026 A1* | 4/2020 | Lovitt | G10L 15/22 |

FOREIGN PATENT DOCUMENTS

| | | | | |
|---|---|---|---|---|
| CA | 2912243 | C | * 9/2019 | G06F 40/117 |
| CN | 103250207 | B | * 1/2016 | G10L 19/00 |
| CN | 105612577 | A | 5/2016 | |
| CN | 109313907 | A | 2/2019 | |
| CN | 109564760 | A | * 4/2019 | G10L 19/008 |
| CN | 112889022 | A | * 6/2021 | G06F 3/016 |
| CN | 112955861 | A | * 6/2021 | G06F 3/167 |
| EP | 3399398 | A1 | 11/2018 | |
| EP | 3720149 | A1 | 10/2020 | |
| GB | 2578715 | A | 5/2020 | |
| KR | 20060054678 | A | * 11/2004 | G10L 21/06 |
| WO | WO-2014176682 | A1 | * 11/2014 | G06F 3/011 |
| WO | WO-2017205637 | A1 | * 11/2017 | G10L 19/008 |
| WO | 2019/091860 | A1 | 5/2019 | |

OTHER PUBLICATIONS

Extended European Search Report received for corresponding European Patent Application No. 20785230.2, dated Nov. 29, 2022, 8 pages.
Search Report received for corresponding United Kingdom Patent Application No. 1904626.7, dated Oct. 4, 2019, 3 pages.
International Search Report and Written Opinion received for corresponding Patent Cooperation Treaty Application No. PCT/FI2020/050172, dated Jun. 8, 2020, 22 pages.
Gabin et al., "5G Multimedia Standardization", Journal of ICT Standardization, vol. 6, No. 1-2, 2018, pp. 117-136.
Office Action for Chinese Application No. 202080027156.2 dated Mar. 27, 2024, 32 pages.

* cited by examiner

AUDIO CODEC EXTENSION

RELATED APPLICATION

This application claims priority to PCT Application No. PCT/FI2020/050172, filed on Mar. 19, 2020, which claims priority to GB Application No. 1904626.7, filed on Apr. 2, 2019 each of which is incorporated herein by reference in its entirety.

FIELD

The present application relates to apparatus and methods for audio codec extensions, but not exclusively for audio codec extension for automatic translation.

BACKGROUND

Immersive audio codecs are being implemented supporting a multitude of operating points ranging from a low bit rate operation to transparency. An example of such a codec is the immersive voice and audio services (IVAS) codec which is being designed to be suitable for use over a communications network such as a 3GPP 4G/5G network. Such immersive services include uses for example in immersive voice and audio for applications such as virtual reality (VR), augmented reality (AR) and mixed reality (MR). This audio codec is expected to handle the encoding, decoding and rendering of speech, music and generic audio. It is furthermore expected to support channel-based audio and scene-based audio inputs including spatial information about the sound field and sound sources. The codec is also expected to operate with low latency to enable conversational services as well as support high error robustness under various transmission conditions.

Automatic language translation can be achieved using various means. Typically, an application or a service, for example, a server in the cloud, receives an audio signal comprising speech, recognizes words within the audio signals, evaluates what the words mean (e.g., what an individual word most likely means in context with other words), and creates an audio signal comprising a corresponding translation to the desired language. The input and output languages may be given, or the input language can be recognized as part of the overall recognition task. Automatic language translation can utilize for example speech-to-text (STT) and text-to-speech (TTS) techniques. In modern systems at least one task in the chain may be performed by means of artificial intelligence (AI) such as deep neural networks (DNN). Processors capable of handling this type of processing are becoming common in modern mobile equipment and devices such as smartphones.

SUMMARY

There is provided according to a first aspect an apparatus comprising means configured to: receive a primary track comprising at least one audio signal; receive at least one secondary track, each of the at least one secondary track comprising at least one audio signal, wherein the at least one secondary track is based on the primary track; and decode and render the primary track and the at least one secondary track using spatial audio decoding.

The primary track comprising at least one audio signal may comprise at least one of: at least one captured microphone audio signal; at least one transport audio signal and spatial metadata generated based on a spatial analysis of at least one captured microphone audio signal; an audio object comprising at least one audio signal and spatial metadata; an ambisonics format audio signal based on a spatial analysis of at least one captured microphone audio signal.

The primary track comprising at least one audio signal may comprise at least one speech component in a first language.

The at least one secondary track based on the primary track may be at least one audio signal comprising at least one speech component in a second language.

The primary track comprising at least one audio signal may comprise at least one speech component in a first language and the at least one secondary track based on the primary track may be at least one audio signal associated with a location of the at least one audio signal.

The means may be further configured to receive information parameters associated with the at least one secondary track and/or the primary track, wherein the information parameters associated with the at least one secondary track and/or the primary track may be at least one of: a primary track reference time; a primary track initial talk time; a primary track element length; a secondary track to primary track offset; a secondary track to primary track delay; and a secondary track element length.

The means may be further configured to receive at least one user input, wherein the means configured to decode and render the primary track and the at least one secondary track using spatial audio decoding may be further configured to decode and render the primary track and the at least one secondary track based on the user input to modify at least one of the primary track and the at least one secondary track.

The means configured to decode and render the primary track and the at least one secondary track based on the user input to modify at least one of the primary track and the at least one secondary track may be configured to perform at least one of: modify a rendering position or location or orientation of an audio object associated with at least one of the primary track and the at least one secondary track; modify a volume of the primary track and the at least one secondary track; and select for rendering at least one of the primary track and the at least one secondary track.

The means may be further configured to receive at least one user input wherein the at least one user input is configured to control an encoder configured to encode at least one of the primary track and the at least one secondary track.

The primary and/or at least one secondary track may comprise one of: an enhanced voice system encoded multichannel audio signal; and an Immersive Voice and Audio Services multichannel audio signal.

According to a second aspect there is provided an apparatus comprising means configured to: obtain a primary track comprising at least one audio signal; and encode the primary track using spatial audio encoding, wherein the primary track is associated with a secondary track generated based on the primary track and further encoded using spatial audio encoding.

The primary track comprising at least one audio signal may comprise at least one of: at least one captured microphone audio signal; at least one transport audio signal and spatial metadata generated based on a spatial analysis of at least one captured microphone audio signal; an audio object comprising at least one audio signal and spatial metadata; and an ambisonics format audio signal based on a spatial analysis of at least one captured microphone audio signal.

The primary track comprising at least one audio signal may comprise at least one speech component in a first language.

The means may be further configured to generate the at least one secondary track, each of the at least one secondary track comprising at least one audio signal may comprise at least one speech component in a second language.

The primary track comprising at least one audio signal may comprise at least one speech component in a first language and the means for is further configured to generate the at least one secondary track, the at least one secondary track being at least one audio signal associated with a location of the at least one audio signal.

The means may be further configured to generate information parameters associated with the at least one secondary track and/or the primary track, wherein the information parameters associated with the at least one secondary track and/or the primary track may be at least one of: a primary track reference time; a primary track initial talk time; a primary track element length; a secondary track to primary track offset; a secondary track to primary track delay; and a secondary track element length.

The means may be further configured to receive at least one user input, wherein the means configured to obtain the primary track and configured to generate the at least one secondary track may be further configured to modify at least one of the primary track and the at least one secondary track based on the user input.

The means configured to modify at least one of the primary track and the at least one secondary track based on the user input may be configured to perform at least one of: modify a spatial position or location or orientation of an audio object associated with the primary track and the at least one secondary track; modify a volume of the primary track and the at least one of the at least one secondary track; and select at least one of the primary track and the at least one of the at least one secondary track.

The means may be further configured to receive at least one user input wherein the at least one user input may be configured to control the means configured to encode the primary track using spatial audio encoding.

A system may comprise: the apparatus as discussed above configured to: receive a primary track comprising at least one audio signal; receive at least one secondary track, each of the at least one secondary track comprising at least one audio signal, wherein the at least one secondary track is based on the primary track; and decode and render the primary track and the at least one secondary track using spatial audio decoding; a further apparatus comprising means configured to: receive the primary track; generate at least one secondary track based on the primary track; encode the at least one secondary track using spatial audio encoding; and the apparatus comprising means configured to: obtain a primary track comprising at least one audio signal; and encode the primary track using spatial audio encoding, wherein the primary track is associated with a secondary track generated based on the primary track and further encoded using spatial audio decoding.

According to a third aspect there is provided a method comprising: receiving a primary track comprising at least one audio signal; receiving at least one secondary track, each of the at least one secondary track comprising at least one audio signal, wherein the at least one secondary track is based on the primary track; and decoding and rendering the primary track and the at least one secondary track using spatial audio decoding.

The primary track comprising at least one audio signal may comprise at least one of: at least one captured microphone audio signal; at least one transport audio signal and spatial metadata generated based on a spatial analysis of at least one captured microphone audio signal; an audio object comprising at least one audio signal and spatial metadata; an ambisonics format audio signal based on a spatial analysis of at least one captured microphone audio signal.

The primary track comprising at least one audio signal may comprise at least one speech component in a first language.

The at least one secondary track based on the primary track may be at least one audio signal comprising at least one speech component in a second language.

The primary track comprising at least one audio signal may comprise at least one speech component in a first language and the at least one secondary track based on the primary track may be at least one audio signal associated with a location of the at least one audio signal.

The method may further comprise receiving information parameters associated with the at least one secondary track and/or the primary track, wherein the information parameters associated with the at least one secondary track and/or the primary track may be at least one of: a primary track reference time; a primary track initial talk time; a primary track element length; a secondary track to primary track offset; a secondary track to primary track delay; and a secondary track element length.

The method may further comprise receiving at least one user input, wherein decoding and rendering the primary track and the at least one secondary track using spatial audio decoding may further comprise decoding and rendering the primary track and the at least one secondary track based on the user input to modify at least one of the primary track and the at least one secondary track.

The decoding and rendering the primary track and the at least one secondary track based on the user input to modify at least one of the primary track and the at least one secondary track may comprise performing at least one of: modifying a rendering position or location or orientation of an audio object associated with at least one of the primary track and the at least one secondary track; modifying a volume of the primary track and the at least one secondary track; and selecting for rendering at least one of the primary track and the at least one secondary track.

The method may comprise receiving at least one user input wherein the at least one user input may control encoding at least one of the primary track and the at least one secondary track.

The primary and/or at least one secondary track may comprise one of: an enhanced voice system encoded multichannel audio signal; and an Immersive Voice and Audio Services multichannel audio signal.

According to a fourth aspect there is provided a method comprising: obtaining a primary track comprising at least one audio signal; and encoding the primary track using spatial audio encoding, wherein the primary track is associated with a secondary track generated based on the primary track further encoded using spatial audio encoding.

The primary track comprising at least one audio signal may comprise at least one of: at least one captured microphone audio signal; at least one transport audio signal and spatial metadata generated based on a spatial analysis of at least one captured microphone audio signal; an audio object comprising at least one audio signal and spatial metadata; and an ambisonics format audio signal based on a spatial analysis of at least one captured microphone audio signal.

The primary track comprising at least one audio signal may comprise at least one speech component in a first language.

The method may further comprise generating the at least one secondary track, each of the at least one secondary track comprising at least one audio signal may comprise at least one speech component in a second language.

The primary track comprising at least one audio signal may comprise at least one speech component in a first language and the method further comprising generating the at least one secondary track, the at least one secondary track may be at least one audio signal associated with a location of the at least one audio signal.

The method may further comprise generating information parameters associated with the at least one secondary track and/or the primary track, wherein the information parameters associated with the at least one secondary track and/or the primary track may be at least one of: a primary track reference time; a primary track initial talk time; a primary track element length; a secondary track to primary track offset; a secondary track to primary track delay; and a secondary track element length.

The method may further comprise receiving at least one user input, wherein obtaining the primary track and generating the at least one secondary track may comprise modifying at least one of the primary track and the at least one secondary track based on the user input.

Modifying at least one of the primary track and the at least one secondary track based on the user input may comprise at least one of: modifying a spatial position or location or orientation of an audio object associated with the primary track and the at least one secondary track; modifying a volume of the primary track and the at least one of the at least one secondary track; and selecting at least one of the primary track and the at least one of the at least one secondary track.

The method may further comprise receiving at least one user input wherein the at least one user input may control encoding the primary track using spatial audio encoding.

A method may comprise: obtaining a primary track comprising at least one audio signal; encoding the primary track using spatial audio encoding, wherein the primary track is associated with a secondary track generated based on the primary track and further encoded using spatial audio decoding; generating the at least one secondary track based on the primary track; encoding the at least one secondary track using spatial audio encoding; decoding and rendering the primary track and the at least one secondary track using spatial audio decoding.

According to a fifth aspect there is provided an apparatus comprising at least one processor and at least one memory including a computer program code, the at least one memory and the computer program code configured to, with the at least one processor, cause the apparatus at least to: obtain a primary track comprising at least one audio signal; and encode the primary track using spatial audio encoding, wherein the primary track is associated with a secondary track generated based on the primary track further encoded using spatial audio encoding.

The primary track comprising at least one audio signal may comprise at least one of: at least one captured microphone audio signal; at least one transport audio signal and spatial metadata generated based on a spatial analysis of at least one captured microphone audio signal; an audio object comprising at least one audio signal and spatial metadata; and an ambisonics format audio signal based on a spatial analysis of at least one captured microphone audio signal.

The primary track comprising at least one audio signal may comprise at least one speech component in a first language.

The apparatus may further be caused to generate the at least one secondary track, each of the at least one secondary track comprising at least one audio signal may comprise at least one speech component in a second language.

The primary track comprising at least one audio signal may comprise at least one speech component in a first language and the apparatus further caused to generate the at least one secondary track, the at least one secondary track may be at least one audio signal associated with a location of the at least one audio signal.

The apparatus may be further caused to generate information parameters associated with the at least one secondary track and/or the primary track, wherein the information parameters associated with the at least one secondary track and/or the primary track may be at least one of: a primary track reference time; a primary track initial talk time; a primary track element length; a secondary track to primary track offset; a secondary track to primary track delay; and a secondary track element length.

The apparatus may be further caused to receive at least one user input, wherein the apparatus caused to obtain the primary track and generate the at least one secondary track may be caused to modify at least one of the primary track and the at least one secondary track based on the user input.

The apparatus caused to modify at least one of the primary track and the at least one secondary track based on the user input may be caused to perform at least one of: modify a spatial position or location or orientation of an audio object associated with the primary track and the at least one secondary track; modify a volume of the primary track and the at least one of the at least one secondary track; and select at least one of the primary track and the at least one of the at least one secondary track.

The apparatus may further be caused to receive at least one user input wherein the at least one user input may control encoding the primary track using spatial audio encoding.

According to a sixth aspect there is provided an apparatus comprising at least one processor and at least one memory including a computer program code, the at least one memory and the computer program code configured to, with the at least one processor, cause the apparatus at least to: receive a primary track comprising at least one audio signal; receive at least one secondary track, each of the at least one secondary track comprising at least one audio signal, wherein the at least one secondary track is based on the primary track; and decode and render the primary track and the at least one secondary track using spatial audio decoding.

The primary track comprising at least one audio signal may comprise at least one of: at least one captured microphone audio signal; at least one transport audio signal and spatial metadata generated based on a spatial analysis of at least one captured microphone audio signal; an audio object comprising at least one audio signal and spatial metadata; an ambisonics format audio signal based on a spatial analysis of at least one captured microphone audio signal.

The primary track comprising at least one audio signal may comprise at least one speech component in a first language.

The at least one secondary track based on the primary track may be at least one audio signal comprising at least one speech component in a second language.

The primary track comprising at least one audio signal may comprise at least one speech component in a first language and the at least one secondary track based on the primary track may be at least one audio signal associated with a location of the at least one audio signal.

The apparatus may further be caused to receive information parameters associated with the at least one secondary track and/or the primary track, wherein the information parameters associated with the at least one secondary track and/or the primary track may be at least one of: a primary track reference time; a primary track initial talk time; a primary track element length; a secondary track to primary track offset; a secondary track to primary track delay; and a secondary track element length.

The apparatus may further be caused to receive at least one user input, wherein the apparatus caused to decode and render the primary track and the at least one secondary track using spatial audio decoding may further be caused to decode and render the primary track and the at least one secondary track based on the user input to modify at least one of the primary track and the at least one secondary track.

The apparatus caused to decode and render the primary track and the at least one secondary track based on the user input to modify at least one of the primary track and the at least one secondary track may be caused to perform at least one of: modify a rendering position or location or orientation of an audio object associated with at least one of the primary track and the at least one secondary track; modify a volume of the primary track and the at least one secondary track; and select for rendering at least one of the primary track and the at least one secondary track.

The apparatus may be caused to receive at least one user input wherein the at least one user input may control encoding at least one of the primary track and the at least one secondary track.

The primary and/or at least one secondary track may comprise one of: an enhanced voice system encoded multichannel audio signal; and an Immersive Voice and Audio Services multichannel audio signal.

According to a seventh aspect there is provided an apparatus comprising receiving circuitry configured to receive a primary track comprising at least one audio signal; receiving circuitry configured to receive at least one secondary track, each of the at least one secondary track comprising at least one audio signal, wherein the at least one secondary track is based on the primary track; and decoding and rendering circuitry configured to decode and render the primary track and the at least one secondary track using spatial audio decoding.

According to an eighth aspect there is provided an apparatus comprising: obtaining circuitry configured to obtain a primary track comprising at least one audio signal; and encoding circuitry configured to encode the primary track using spatial audio encoding, wherein the primary track is associated with a secondary track generated based on the primary track further encoded using spatial audio encoding.

According to a ninth aspect there is provided a computer program comprising instructions [or a computer readable medium comprising program instructions] for causing an apparatus to perform at least the following: receiving a primary track comprising at least one audio signal; receiving at least one secondary track, each of the at least one secondary track comprising at least one audio signal, wherein the at least one secondary track is based on the primary track; and decoding and rendering the primary track and the at least one secondary track using spatial audio decoding.

According to a tenth aspect there is provided a computer program comprising instructions [or a computer readable medium comprising program instructions] for causing an apparatus to perform at least the following: obtaining a primary track comprising at least one audio signal; and encoding the primary track using spatial audio encoding, wherein the primary track is associated with a secondary track generated based on the primary track further encoded using spatial audio encoding.

According to an eleventh aspect there is provided a non-transitory computer readable medium comprising program instructions for causing an apparatus to perform at least the following: receiving a primary track comprising at least one audio signal; receiving at least one secondary track, each of the at least one secondary track comprising at least one audio signal, wherein the at least one secondary track is based on the primary track; and decoding and rendering the primary track and the at least one secondary track using spatial audio decoding.

According to a twelfth aspect there is provided a non-transitory computer readable medium comprising program instructions for causing an apparatus to perform at least the following: obtaining a primary track comprising at least one audio signal; and encoding the primary track using spatial audio encoding, wherein the primary track is associated with a secondary track generated based on the primary track further encoded using spatial audio encoding.

According to a thirteenth aspect there is provided an apparatus comprising: means for receiving a primary track comprising at least one audio signal; means for receiving at least one secondary track, each of the at least one secondary track comprising at least one audio signal, wherein the at least one secondary track is based on the primary track; and means for decoding and rendering the primary track and the at least one secondary track using spatial audio decoding.

According to a fourteenth aspect there is provided an apparatus comprising: means for obtaining a primary track comprising at least one audio signal; and means for encoding the primary track using spatial audio encoding, wherein the primary track is associated with a secondary track generated based on the primary track further encoded using spatial audio encoding.

According to a fifteenth aspect there is provided a computer readable medium comprising program instructions for causing an apparatus to perform at least the following: receiving a primary track comprising at least one audio signal; receiving at least one secondary track, each of the at least one secondary track comprising at least one audio signal, wherein the at least one secondary track is based on the primary track; and decoding and rendering the primary track and the at least one secondary track using spatial audio decoding.

According to a sixteenth aspect there is provided a computer readable medium comprising program instructions for causing an apparatus to perform at least the following: obtaining a primary track comprising at least one audio signal; and encoding the primary track using spatial audio encoding, wherein the primary track is associated with a secondary track generated based on the primary track further encoded using spatial audio encoding.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the extension of audio codecs for purposes such as real time language translation (RTLT).

The invention relates to speech and audio codecs and in particular immersive audio codecs supporting a multitude of operating points ranging from a low bit rate operation to transparency as well as a range of service capabilities, e.g., from mono to stereo to fully immersive audio encoding/decoding/rendering. An example of such a codec is the 3GPP IVAS codec for which the standardization process has begun in 3GPP TSG-SA4 in October 2017. The completion of the standard is currently expected by end of 2020.

The IVAS codec is an extension of the 3GPP Enhanced Voice Services (EVS) codec and intended for new immersive voice and audio services over 4G/5G. Such immersive services include, e.g., immersive voice and audio for virtual reality (VR). The multi-purpose audio codec is expected to handle the encoding, decoding and rendering of speech, music and generic audio. It is expected to support channel-based audio and scene-based audio inputs including spatial information about the sound field and sound sources. It is also expected to operate with low latency to enable conversational services as well as support high error robustness under various transmission conditions.

Input audio signals are presented to the IVAS encoder in a supported format (or in some allowed combination of the supported formats). Similarly, a decoder can output the audio signal in a supported format (or combinations thereof) or render it, e.g., for a given loudspeaker configuration or direct headphone presentation (where binauralization methods such as use of head-related transfer functions (HRTF) may be applied). A pass-through mode where an audio signal is provided in its original format after transmission (encoding/decoding) may be part of the codec operation.

Figure 1A:
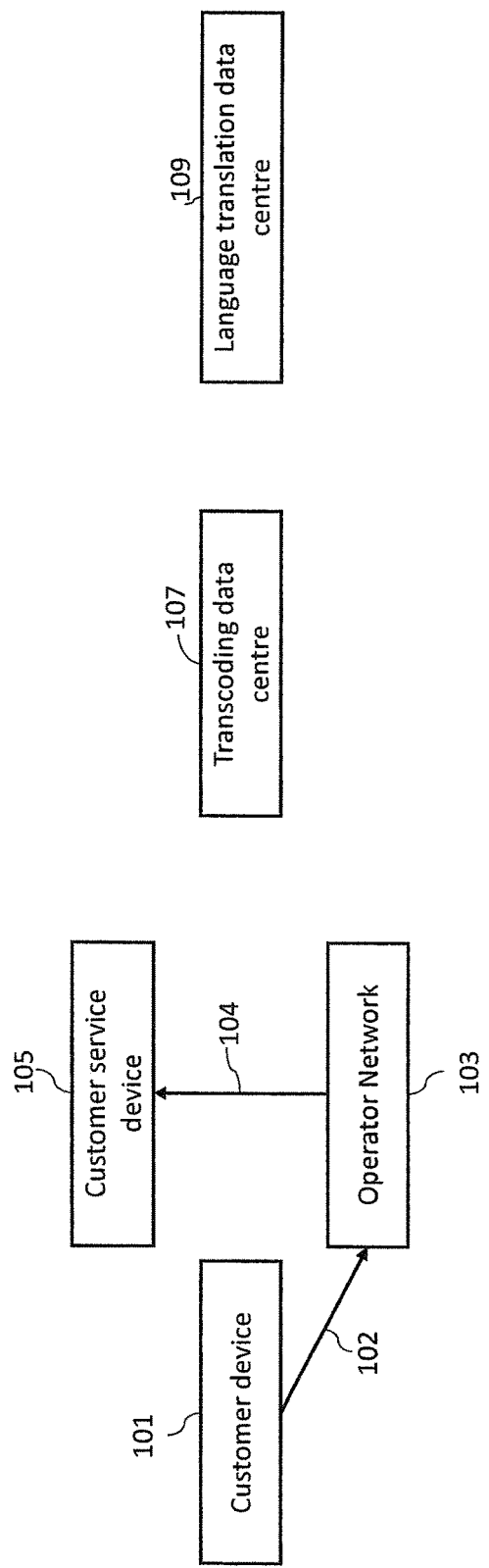
FIGS. 1a and 1b show schematically a system of apparatus suitable for implementing an automatic translation operation.
Figure 1B:
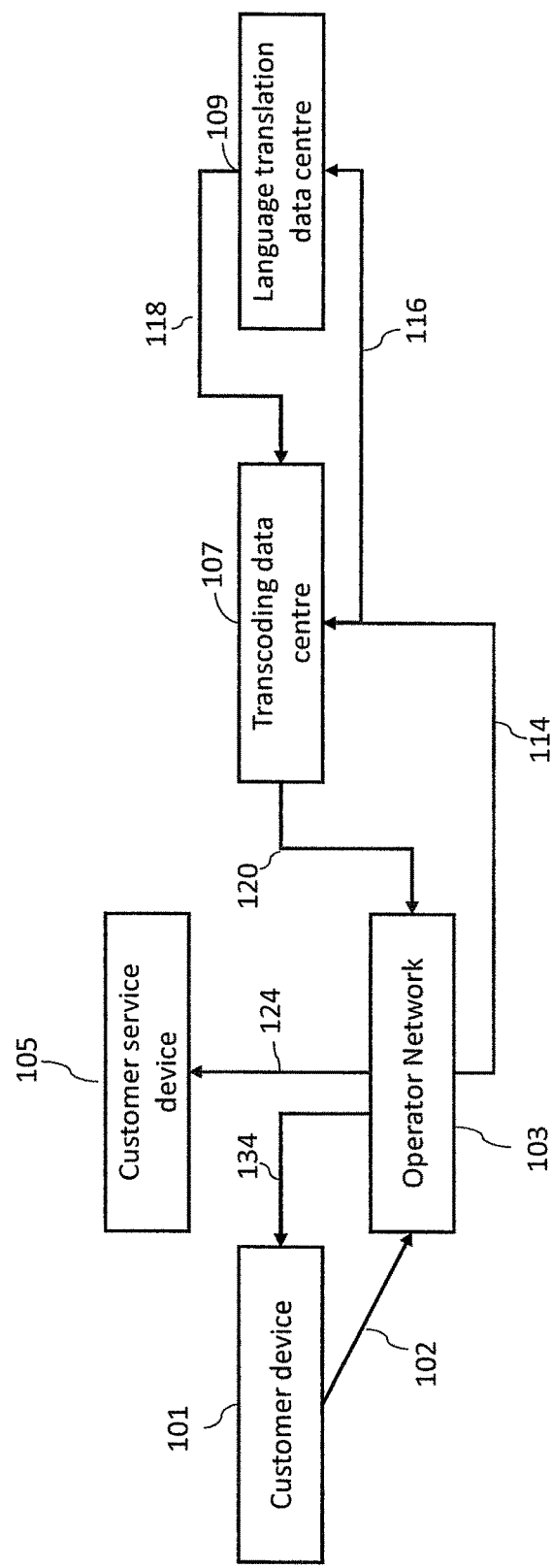

FIGS. 1a and 1b illustrate a current example of a real time language translation (RTLT) system implemented over an operator network. A customer device 101 is configured to attempt to set up a voice call from a customer to a customer service device 105 (in this example one direction only is shown for simplicity). For example, a car rental customer traveling in a foreign country has an issue with their rental car. This user places a voice call using their device 101 over the operator network 103 via a dedicated customer service number to solve the issue. As seen in FIG. 1a the call is connected 102 to the network 103 and then connected 104 to the customer service device 105.

FIG. 1b shows where the dedicated customer service number is for an audio translation service. As previously shown in FIG. 1a the customer device 101 is configured to place a voice call over the operator network 103 to the customer service device 105. As seen in FIG. 1b the call is connected 102 to the network 103 and then connected 124 to the customer service device 105 but is also routed 114 to a transcoding data centre 107. The transcoding data centre 107 may be configured to convert the voice call into pulse code modulated (PCM) audio data format and pass this PCM audio signal via connection 116 to the language translation data centre 109. The language translation data centre 109 receives the transcoded audio data and carries out a language translation of the audio signal. In this example, there may be a chain of data centres corresponding to a specific implementation. Alternatively, there could be a single language translation data centre 109 (or a longer chain of data centres). The language translation data centre 109 then passes the translation back to the transcoding data centre 107 via connection 118. The transcoding data centre 107 may transcode a PCM audio signal of the translation to a suitable encoded form at some suitable/available bit rate, such as, e.g., to an EVS or Adaptive Multi-Rate Wideband (AMR-WB) or Adaptive Multi-Rate (AMR) bitstream via connection 120 to the operator network 103 which can then pass the translation audio signals to the customer device 101 via connection 134 and to the customer service device 105 via connection 124.

The automatic translation scenario of FIG. 1b resembles a multi-party conference call and it results in a "sequential voice experience": First a first user talks and the second user hears what is being said. This experience differs from a traditional voice call in the sense that the second user should not start to talk at that point but rather wait for translation. Both first user and second user then hear the translation. This is then followed by response by the second user with a translation again provided to both users, and so on.

Figure 2:
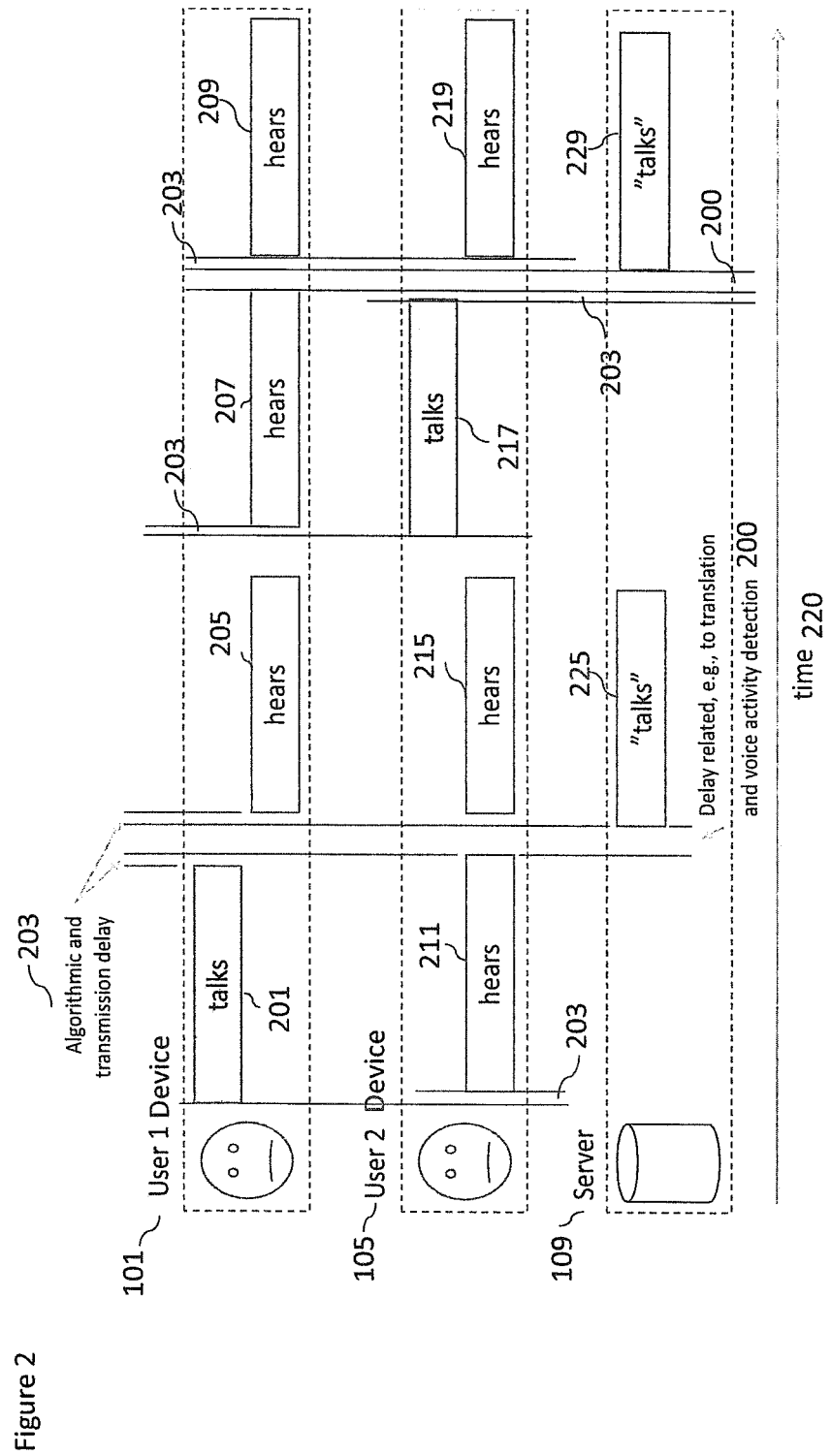
FIG. 2 shows schematically an example user experience for sequential translations as implemented in the system as shown in FIG. 1b.

The sequential voice experience is illustrated over a timeline in FIG. 2. In this example, user 1 device 101, user 2 device 105 and server 109 communicate over the network. In this example the user operating user 1 device 101 talks and user 2 device 105 responds with translation playback from the server 109 in between.

Thus for example user 1 device 101 is shown with an initial talk time 201 which is heard by the user 2 device at hear time 211 (which is substantially the same as the initial talk time 201 accounting for codec algorithmic delay and the transmission delay over the network 203).

There is also a delay between the initial talk time 201 and a translation talk time 225 caused by algorithmic and transmission delay 203 between the user 1 device and the server and furthermore a delay 200 related to the start of the translation following, e.g., a voice activity detection detecting that the talker using user 1 device has stopped speaking at the server (in order to prevent the translation 'talking over' the user of user 1 device 101) and any algorithmic translation delay. The translation is then passed to the user 1 device 101 which has an associated hear translation time 205 and to user 2 device 105 which has an associated hear translation time 215. The associated hear translation time 205 and associated hear translation time 215 are delayed from the start of the translation talk time 225 caused by a codec algorithmic delay and the transmission delay over the network 203 between the server and the user devices. In this example it is assumed that the network delay is identical between user 1 device 101 and the user 2 device 105 and between the server 109 and user 1 device 101 (and also server 109 and user 2 device 105) although this is not necessarily the case in practice.

The user of user 2 device 105 is shown with 'response' talk time 217 which is heard by the user 1 device at hear time 207 (which is substantially the same as the initial talk time 217 accounting for codec algorithmic delay and the transmission delay over the network).

There then is a delay between the response talk time 217 and a translation talk time 229 caused by algorithmic and transmission delay between the user 2 device and the server and furthermore the delay 200 related to the start of the translation following a voice activity detection detecting that the talker using user 2 device has stopped speaking at the server (in order to prevent the translation 'talking over' the user of user 2 device 105) and any algorithmic translation delay. The translation is then passed to the user 1 device 101 which has an associated hear translation time 209 and to user 2 device 105 which has an associated hear translation time 219. The associated hear translation time 209 and associated hear translation time 219 are delayed from the start of the translation talk time 229 caused by a codec algorithmic delay and the transmission delay over the network 203 between the server and the user devices.

The time consumed by this exchange between the two users (via the translation) is effectively doubled and for each user the greatest time is spent listening. This is because the most active talker is actually the server 109 providing the translation. In a traditional voice call, like any real-life conversation between two people, it can be expected that each talker on average talks close to 50% of the time (accounting for pauses, etc.), while here the corresponding number will be below 25%.

The concept as discussed in further detail in the embodiments as discussed hereafter is to provide secondary (and in some embodiments further) 'tracks' or audio signals which may be considered to be alternate audio signals. These secondary 'tracks' may be generated based on the original audio signals or primary track and may be encoded and transmitted to a receiver. Additionally in some embodiments other information may be generated based on the primary and/or secondary tracks and this information also passed to the receiver. The receiver configured to receive the primary track, the secondary track and the information can in some embodiments be configured to modify the secondary track, for example to switch or alternate between the decoding and/or rendering of the primary and the secondary tracks. Furthermore the secondary track can be modified in spatial processing in some embodiments. For example when rendered the position, orientation or distance of the audio object associated with the secondary track can be changed, the coherence can be changed or (relative size) of the object can be changed or the volume of the audio object changed.

In the following examples the use of the secondary 'track' is for the implementation of Real-Time Language Translation (RTLT) as discussed previously. The use of the secondary 'track' in RTLT applications can attempt to generate a more natural flow of discussion between users (which is otherwise being constantly interrupted by the sequential translation approach shown in FIGS. 1b and 2). Additionally the embodiments as discussed may enable a system to significantly reduce the call time (as the sequential approach effectively doubles the length of time a call takes due to the translation echoing effect). This translation echo can be particularly ineffective and frustrating when the users "almost understand each other" while still requiring some support for their understanding from the translation. For example, at least one user may know the basics of the language of the second user.

The embodiments as such describe conversational spatial audio coding. Some embodiments are primarily applicable and implementable in a spatial audio codec including in-band signalling, such as the 3GPP IVAS (Immersive Voice and Audio Services) codec. In some embodiments the translation can be implemented via external support by a network element, where the added functionality relates to packetization and out-of-band signalling (e.g., RTP—Real-time Transport Protocol header). In addition, in some embodiments there can be a direct user interface input in at least the rendering of spatial audio (which can be performed, e.g., by an external renderer). In some embodiments the user interface of the recipient can control also at least some aspects of the encoder-side operation.

The embodiments as discussed herein therefore disclose a system for RTLT using a conversational spatial audio coding. In such embodiments RTLT is enabled with spatial reproduction to take advantage of the so-called cocktail party effect. In a spatial rendering, like in real life, a user is generally capable of concentrating on one of many audio sources regardless of their temporal overlap. Thus these embodiments allow the simultaneous playback of more than one voice. Support for additional control and features are implemented in the coding system by the introduction of RTLT "audio-object metadata". In some embodiments specific time synchronization information is furthermore included allowing the synchronisation between translation audio and an original language audio signal.

In some embodiments there are described alternative implementations which extend IVAS codec functionality for various input formats, signalling time offset synchronization, and requesting a new codec mode including an indication for stopping part of a local playback.

An advantage of the embodiments as discussed hereafter is that the proposed RTLT feature can be integrated into (by use of extensions/or updates of) existing voice services (such as MTSI—Multimedia Telephony Service for IP Multimedia Subsystem) and thus enables fast deployment and is easy to use. The feature can thus become part of regular (immersive) voice calls. In some embodiments the RTLT feature can be set to be asymmetric translation (in other words RTLT can be sent in one direction only). Additionally in some embodiments a user can configure the devices described herein to add a voice translation transmission during a call by adding a suitable audio object input (for example by selecting a translation user interface on their device).

In some embodiments the RTLT (automatic translation) functionality can be implemented on the local device or any suitable network service, for example, edge computing service. In some embodiments, for a one-to-one call, a local translation service on the user's device is configured to perform the automatic translation. In such embodiments a local translation provides a low delay translation which has the ability to work on uncompressed audio signals (which can affect the quality of the translation). In some embodiments a network service can be used for the translation. These embodiments may allow the user device to be lower powered device (for example these embodiments may be used by devices with a lower processor and memory configuration than devices performing local translation). Further such embodiments enable the device to have improved battery life (where no extra processing takes place) and furthermore the translation may be more accurate with the vastly higher computational power available at the server (or in the cloud). On a network service it may be possible to make available a larger set of languages between which translation and voice synthesis is possible. Furthermore these embodiments have as discussed a lower delay as original language audio signals need not go through a transcoding process.

In some embodiments for a conference call with several participants and several languages the translation may be performed at a server (or in the cloud) in order to conserve bandwidth and to take advantage of available higher computational capacity.

In further embodiments for a conference call with several participants and several languages some language translations may be performed on local user devices while some language translation may be performed at a server (or in the cloud). A receiving user's device may thus, e.g., receive at least four audio signals corresponding to a first talker's voice in a first language and its translation into a third language and a second talker's voice in a second language and its translation into a fourth language. A receiving user's device may alternatively, e.g., receive at least two audio signals corresponding to a first talker's voice translated from a first language into a third language and a second talker's voice translated from a second language into a fourth language. Here the receiving user's device settings (such as service preferences) or call negotiation signalling may indicate that the receiving user understands both the third language and the fourth language (but may not understand either of the first and the second language).

In the embodiments as discussed in further detail hereafter, at least one input audio signal or "track" is translated and at least a second (translated) audio signal or "track" is synthesized. In some embodiments, these audio tracks are combined in different ways for transmission.

In some embodiments time offset information (which can be a two-component offset information) can be created and transmitted with the audio signals.

In the following discussion there may be terms introduced which were introduced and defined previously in patent applications GB1811847.1 and PCT/EP2018/079980.

Figure 3:
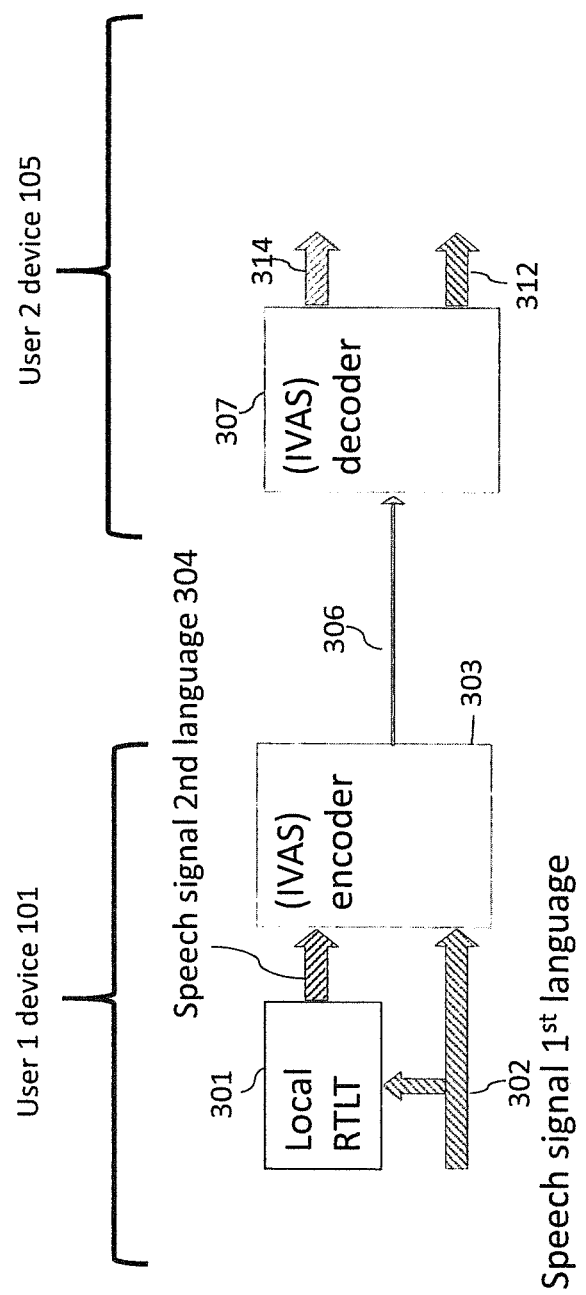
FIG. 3 shows schematically a first example encoder architecture according to some embodiments.

With respect to FIG. 3 is shown schematically a high-level view of some embodiments. In this example two users operating a first user device or user 1 device 101 and a second user device or user 2 device 105 respectively are able to implement real time language translation between each other over an audio call. In FIG. 3 there is shown the apparatus for performing a local RTLT processing which is configured to translate the speech audio signal by user 1 input to the user 1 device 101 into a language understood by user 2 and which is received by the user 2 device 105.

Thus in some embodiments the user 1 device comprises an input configured to receive a speech audio signal 302 in a first language. This may be considered as a primary track or first track. The input may be connected to a local real-time language translator (RTLT) 301 and to an (IVAS) encoder 303. In the following embodiments the speech audio signal 302 in a first language (and also the speech audio signal 304 in a second language) are mono audio signals. However in some embodiments the audio signal 302 in a first language is a multichannel audio signal. The speech audio signal 304 in a second language may be a mono audio signal or a multichannel audio signal in such embodiments. For example the user device may generate more than one simultaneous translation (in different languages) based on the one or more original language signals being captured. Additionally in some embodiments the speech audio signal 302 in a first language is not a captured audio signal from one (or more than one microphone) but is generated from spatial analysis of audio signals from two or more audio signals. The spatial analysis may in some embodiments result in the determination and isolation of one or more than one speech audio signal within the audio environment. For example the user 1 device may be used as part of an audio conference system and comprise a microphone array configured to generate a multi-channel audio signal input. The multi-channel audio signals may then be analysed to determine whether there is one or more speech audio sources and generate audio signals for each speech audio source (for example by beamforming the multi-channel audio signals or otherwise processing the audio signals).

The local real-time language translator (RTLT) 301 is configured to receive the speech audio signal 302 in a first language and output a translation audio signal. The translation audio signal or speech audio signal 304 in a second language is output to the (IVAS) encoder 303. The local real-time language translator (RTLT) 301 may be implemented as any known real-time translator and may be implemented on translation based software and/or hardware (for example AI or deep learning processor or processors implemented within the device). In embodiments where there is more than one speech audio signal input then each speech audio signals can then each be translated and a separate speech audio signal in the second language generated. In some embodiments where there is more than one speech audio signal input, at least one the plurality of speech audio signal inputs may be selected, e.g., based on user indication to be translated with at least one second language speech audio signal correspondingly generated.

In the following examples there are two languages spoken by the two users. In some embodiments where there are more than two languages spoken by the users in the system (for example where there are three or more users communicating via the system) then the RTLT 301 is configured to generate speech audio signals in further languages and pass these speech audio signals in the further languages to the encoder 303.

The (IVAS) encoder 303 is configured to receive the speech audio signal 302 in the first language and the speech audio signal 304 in the second language. The encoder 303 is then configured to encode these based on a determined encoding method and generate an encoded bitstream 306. The encoded bitstream 306 can be transmitted over the network. The encoder 303 can in some embodiments be a computer (running suitable software stored on memory and on at least one processor), or alternatively a specific device utilizing, for example, FPGAs or ASICs.

In the following example the encoder is configured to receive mono speech audio signals but the speech audio signals in some embodiments comprises multichannel audio signals. In such embodiments the multichannel audio signals may in some embodiments be processed to generate a suitable 'transport' audio signal (such as an encoded audio signal comprising mono, stereo, one or more downmixed or one or more selected channels audio signals and encoded stereo or multichannel parameters as metadata associated with the encoded mono audio signal).

In some embodiments the encoder 303 is an Immersive Voice and Audio Services (IVAS) core encoder. The IVAS core encoder may be configured to receive the audio signals and encode these according to the IVAS standard.

In some embodiments the encoder 303 further comprises a metadata encoder. The metadata encoder is configured to receive spatial metadata and/or other metadata (for example identifying the language associated with the speech audio signal) and encode it or compress it in any suitable manner.

In some embodiments the encoder 303 comprises a multiplexer configured to combine or multiplex the encoded audio signals and/or the metadata generated by the encoder prior to being transmitted.

The user 1 device 101 furthermore is configured to control the transmission of the encoded bitstream. In some embodiments the user 1 device 101 comprises a transmitter configured to transmit the bitstream.

The user 2 device 105 may comprise a (IVAS) decoder 307. The (IVAS) decoder 307 is configured to receive the bitstream 306 and decode (and render) the speech audio signal 312 in a first language and speech audio signal 314 in a second language for spatial audio presentation. The user 2 device 105 can thus be configured to output the original audio and the translation audio signals.

Figure 5:
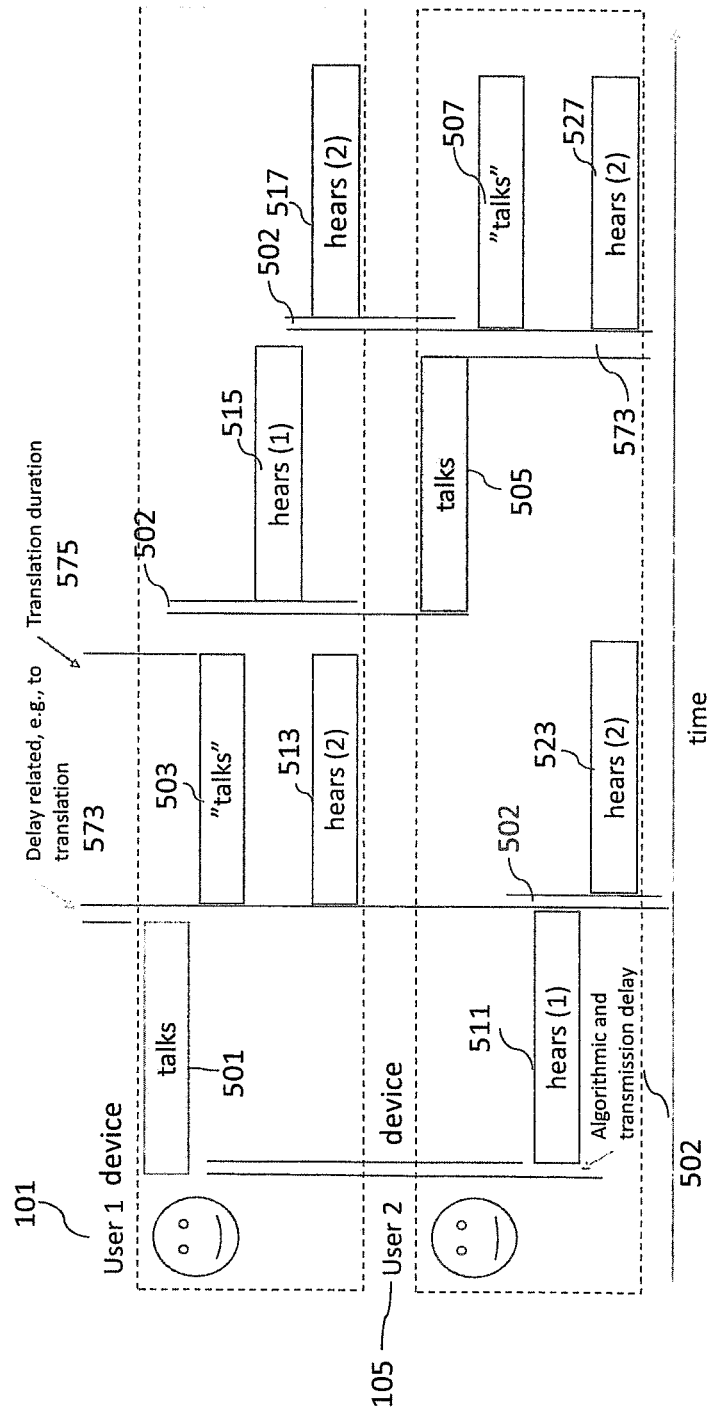
FIG. 5 shows an example operation flow for the first example encoder architecture according to some embodiments.

With respect to FIG. 5 is shown a first example of a user experience corresponding to the implementation of the apparatus shown in FIG. 3 where the RTLT is implemented as a local service on the user devices. This example shows a lack of a server "talking", instead two separate voice tracks from user device are present.

First a first user operating a user 1 device 101 'talks' or in other words user 1 device 101 obtains the speech audio signal in the first language which is shown with an initial talk time 501. This is encoded (and in some embodiments as a spatial audio signal) and transmitted which is received by the user 2 device 105. This is then rendered (in some embodiments as a spatial audio signal) at hear time 511 which is substantially the same as the initial talk time 501 but delayed by the algorithmic and transmission delay time 502.

The user 1 device 101 is further configured to generate the speech audio signal in the second language based on the speech audio signal in the first language. The speech audio signal in the second language is shown in FIG. 5 by the translation talk time 503 which starts following the end of the initial talk time 501 and which may be further delayed by a translation delay time 573 (which may be measured or determined and otherwise signalled to the user 2 device 105). This delay may include a wait time where the system confirms the end of the active voice segment. Additionally in some embodiments the translation duration 575 (the time between the start to the end of the translation associated with the initial talk time) can be determined and signalled to the user 2 device 105.

The speech audio signal may be rendered by the user 1 device 101 which has an associated hear (2) translation time 513. Additionally the user 1 device 101 encodes and transmits the speech audio signal in the second language to the user 2 device 105.

The user of user 2 device 105 may receive the encoded speech audio signal in the second language and render it which is shown with associated hear (2) translation time 523 which is substantially the same as the translation talk time 503 but delayed by the algorithmic and transmission delay time 502. As discussed above in this example all the algorithmic and transmission delays 502 shown are the same for simplicity, however it is likely that the algorithmic and transmission delays will differ due to the differences in transmission pathway, processing capacity of the user devices and other variables.

The user of user 2 device 105 may then generate a response. This is shown in FIG. 5 by the response talk time 505 where the user 2 device 105 obtains the speech audio signal in the second language. This is encoded (and in some embodiments encoded as a spatial audio signal) and transmitted which is received by the user 1 device 101. This is then rendered (in some embodiments as a spatial audio signal) at hear time 515 which is substantially the same as the response talk time 505 but delayed by a similar algorithmic and transmission delay 502.

The user 2 device 105 is further configured to generate the speech audio signal in the first language based on the response speech audio signal in the second language. The speech audio signal in the first language is shown in FIG. 5 by the response translation talk time 507 which starts following the end of the response talk time 505 and which may be further delayed by a translation delay time (which may be measured or determined and otherwise signalled to the user 1 device 101). As shown above this delay may include a wait time where the system confirms the end of the active voice segment. Additionally in some embodiments the translation duration (the time between the start to the end of the translation associated with the response talk time) can be determined and signalled to the user 1 device.

The speech audio signal may be rendered by the user 2 device 101 which has an associated hear (2) translation time 527. Additionally the user 2 device 105 encodes and transmits the speech audio signal in the first language to the user 1 device 101.

The user of user 1 device 101 may receive the encoded response speech audio signal in the first language and render it which is shown with associated hear (2) translation time 517 which is substantially the same as the translation talk time 507 but delayed by the algorithmic and transmission delay time 502.

In such an example it is shown that there are two tracks being listened to by the second user (i.e., two separate voice track rendering). These can be a spatial rendering.

Figure 6:
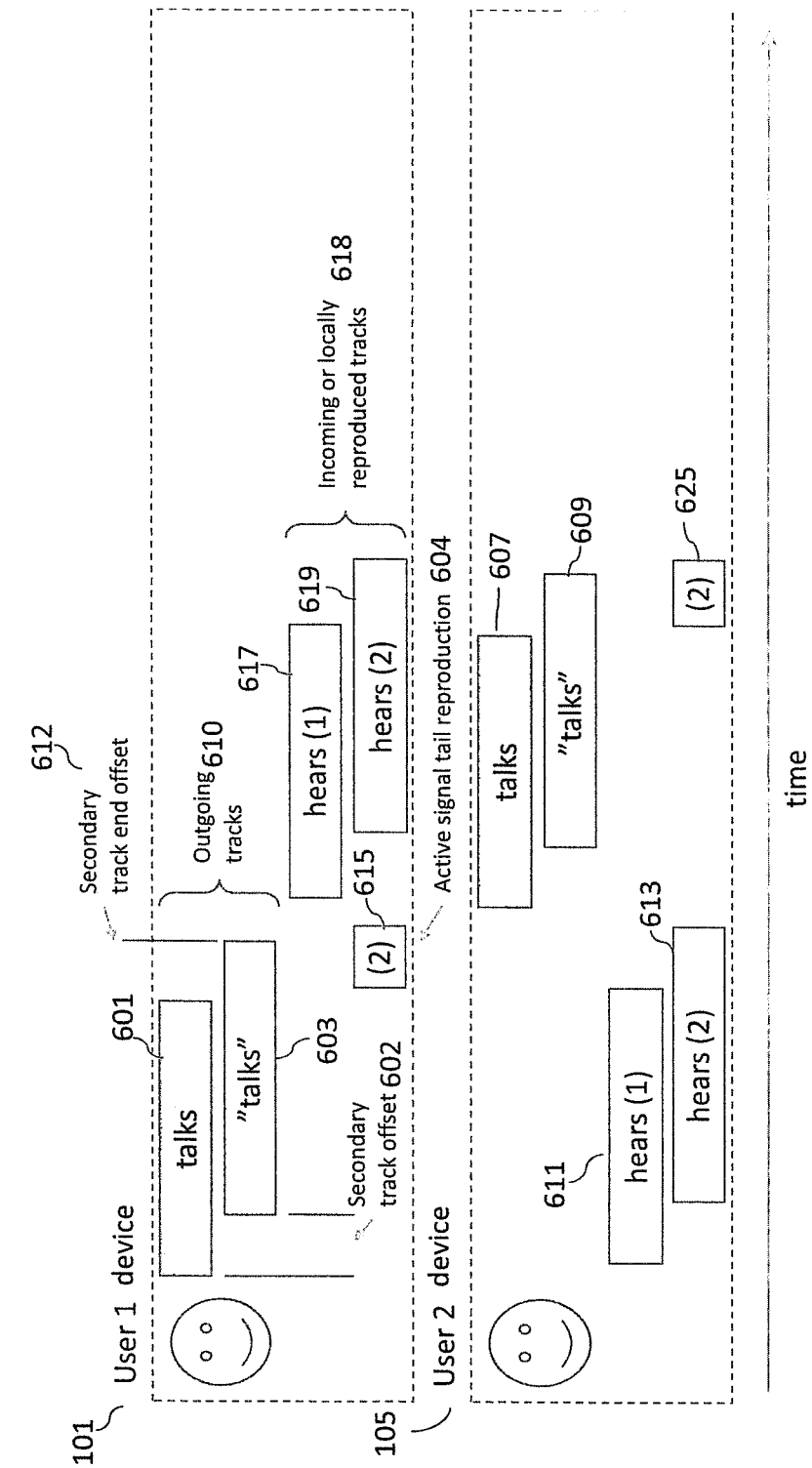
FIG. 6 shows an example operation flow for the second and third example encoder architecture according to some embodiments.

With respect to FIG. 6 is shown a further example of a user experience corresponding to the implementation of the apparatus shown in FIG. 3 where the RTLT is implemented as a local service on the user devices. In this example the translation begins before the original voice passage/utterance ends. This may be implemented in embodiments where the RTLT operates to translate on a word-by-word or sentence-by-sentence basis instead of an active passage at a time. In these embodiments a time offset between the speech audio signal voice segment and the translated segment need not be fixed and may vary from the delay shown in FIG. 6. For example, in some embodiments, the length of the segment that triggers the first translation activation may vary. For simplicity the delays, such as the algorithmic and transmission delay and translation delay are not explicitly shown in FIG. 6 but the embodiments would be subject to these delays.

First a first user operating a user 1 device 101 'talks' or in other words obtains the speech audio signal in the first language which is shown with an initial talk time 601. This is encoded (and in some embodiments as a spatial audio signal) and transmitted which is received by the user 2 device 105. This is then rendered (in some embodiments as a spatial audio signal) at hear time 611 which is substantially the same as the initial talk time 601 but delayed by the algorithmic and transmission delay time.

The user 1 device 101 is further configured to start to generate the speech audio signal in the second language based on the speech audio signal in the first language after a secondary track offset time 602 (which may be signalled to the user 2 device 105). The speech audio signal in the second language is shown in FIG. 6 by the translation talk time 603 which furthermore has a secondary track end offset value 612 (which may be measured or determined and otherwise signalled to the user 2 device 105).

The translation speech audio signal may be rendered by the user 1 device 101 which has an associated translation hear (2) time 615 as the active signal tail reproduction 604. In other words when the user of the user 1 device stops talking at the end of the initial talk time 601 the user 1 device indicates to the user that the user of user 2 device 105 is listening to the translation by the rendering of the active signal tail reproduction 604. Additionally the user 1 device 101 encodes and transmits the speech audio signal in the second language to the user 2 device 105.

As such the user 1 device 101 is configured to provide two outgoing tracks 610, the encoded speech audio signal in the second language and the encoded speech audio signal in the first language.

The user of user 2 device 105 may receive the encoded speech audio signal in the second language and render it to the user of the user 2 device. This is shown in FIG. 6 by the associated translation hear (2) time 613.

The user of user 2 device 105 may then generate a response. This is shown in FIG. 6 by the response talk time 607 where the user 2 device 105 obtains the speech audio signal in the second language. This is encoded (and in some embodiments encoded as a spatial audio signal) and transmitted to the user 1 device. The user 1 device 101 receives the encoded speech audio signal in the second language and is configured to render (in some embodiments as a spatial audio signal) the speech audio signal in the second language such as shown in FIG. 6 by response hear time 617 which is substantially the same as the response talk time 607 but delayed by a similar algorithmic and transmission delay time.

The user 2 device 105 is further configured to generate the speech audio signal in the first language based on the response speech audio signal in the second language which starts before the end of the speech audio signal in the second language (and in some embodiments by the same delay as the secondary track offset 602 time). The speech audio signal in the first language is shown in FIG. 6 by the translation response talk time 609 which starts following a time after the start of the response talk time 607 (which may be measured or determined and otherwise signalled to the user 1 device 101). Additionally in some embodiments the translation duration (the time between the start to the end of the translation associated with the response talk time) can be determined and signalled to the user 1 device.

The translated speech audio signal may be rendered by the user 2 device 105 as an active signal tail reproduction 625. In other words when the user of the user 2 device stops talking at the end of the response talk time 607 the user 2 device indicates to the user that the user of user 1 device 105 is listening to the translation by the rendering of the active signal tail reproduction 625. Additionally the user 2 device 105 encodes and transmits the speech audio signal in the first language to the user 1 device 101.

The user of user 1 device 101 may receive the encoded response speech audio signal in the first language (the translated or secondary track) and render it as shown with associated translation response hear time 619.

As shown in FIG. 6 the encoded response speech audio signal in the first language and encoded response speech audio signal in the second language are the incoming or locally reproduced tracks 618. The rendering of these incoming or locally reproduced tracks can be a spatial rendering.

It can be seen that there is a relationship between the speech audio signal in the first language (captured audio track), the speech audio signal in the second language (RTLT track), and their "visibility". A similar relationship is found in the response signals which is not discussed in further detail here for clarity reasons.

The "visibility" is affected by the 'secondary track offset' which defines the time between the start of the speech audio signal in the first language and the start of the speech audio signal in the second language; the secondary track end offset which defines the time between the end of the speech audio signal in the first language and the end of the speech audio signal in the second language; and the active signal tail reproduction.

The secondary track offset and the secondary track end offset can as described above be signalled to the other device and be used to control the rendering of the audio signals. (In some embodiments this signalling can be used to control also user interface features such as for example visualization of spatial audio or signal activity indication and control functionality availability on a device screen.) The active signal tail reproduction is an example of a locally generated downstream audio indication for the user. The tail of the translation can, e.g., based on the time offset and duration signalling, be spatially rendered to the talker. In such a manner the device can receive an indication on how long the at least second user is going to be listening to the incoming audio.

In some embodiments there can be a signalling to indicate that the receiving user wishes to end the current alternative track playback. This can be used to control the tail reproduction on the transmitting side, too, by ending reproduction upon recipient request.

In some embodiments the determining or measurement of parameters or information associated with the audio signals (such as time offset and duration information) can differ according to the implementation or embodiments. Similarly the methods for encoding and signalling this information or parameters may differ according to the implementation or embodiments. In some embodiments the information or parameters can be derived, for example, based on information such as average sentence length (or average translated passage length) and average talking speed. A typical slow speed for speech (in English) may be about 100 words per minute, a fast pace even 200 words per minute. (For example, Henry Kissinger has been quoted to have spoken at average speed of 90 words per minute in his public speeches, while an auctioneer can hit over 250 words per minute.) If a sentence is typically, e.g., 5-25 words long then an automatic translation can easily fall up to 10-20 words behind.

Figure 4A:
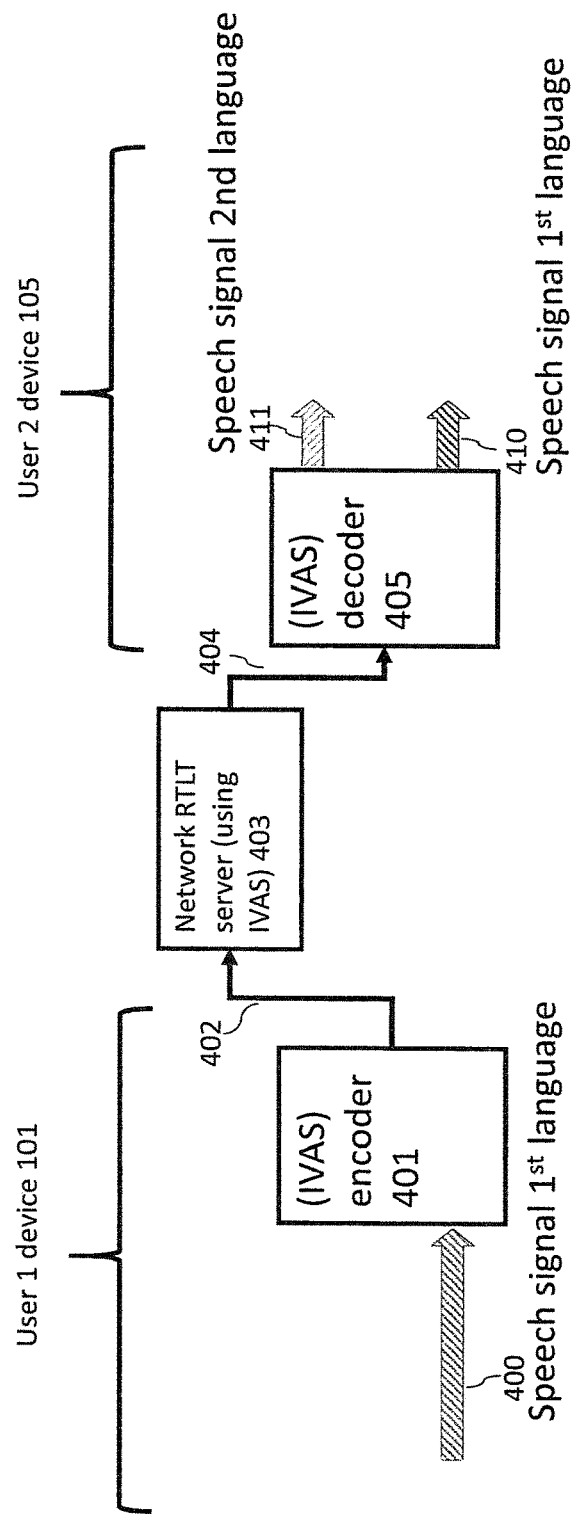
FIGS. 4a and 4b show schematically a second and third example encoder architecture according to some embodiments.

With respect to FIG. 4a is shown a further system configuration. The system as shown in FIG. 4a differs from that shown in FIG. 3 in that the RTLT is not a local (in other ways located within the user device) RTLT but is a network RTLT server.

Thus in some embodiments the user 1 device 101 comprises an input configured to receive a speech audio signal 400 in a first language. The input may be connected to an (IVAS) encoder 303. In the following embodiments the speech audio signal 400 in a first language is a mono audio signal. However in some embodiments the audio signal 400 is a multichannel audio signal. Additionally in some embodiments the speech audio signal 400 in a first language is not a captured audio signal from one (or more than one microphone) but is generated from spatial analysis of audio signals from two or more audio signals. The spatial analysis may in some embodiments result in the determination and isolation of one or more than one speech audio signal within the audio environment. For example the user 1 device may be used as part of an audio conference system and comprise a microphone array configured to generate a multi-channel audio signal input. The multi-channel audio signals may then be analysed to determine whether there is one or more speech audio sources and generate audio signals for each speech audio source (for example by beamforming the multi-channel audio signals or otherwise processing the audio signals).

The (IVAS) encoder 401 is configured to receive the speech audio signal 400 in the first language and configured to encode the audio signal based on a determined encoding method and generate an encoded bitstream 402. The encoder 401 can in some embodiments be a computer (running suitable software stored on memory and on at least one processor), or alternatively a specific device utilizing, for example, FPGAs or ASICs.

In the following example the encoder is configured to receive mono speech audio signals but the speech audio signals in some embodiments comprises multichannel audio signals. In such embodiments the multichannel audio signals may in some embodiments be processed to generate a suitable 'transport' audio signal (such as an encoded audio signal comprising mono, stereo, one or more downmixed or one or more selected channels audio signals and encoded stereo or multichannel parameters as metadata associated with the encoded mono audio signal).

In some embodiments the encoder 401 is an Immersive Voice and Audio Services (IVAS) core encoder. The IVAS core encoder may be configured to receive the audio signals and encode these according to the IVAS standard.

In some embodiments the encoder 401 further comprises a metadata encoder. The metadata encoder is configured to receive spatial metadata and/or other metadata (for example identifying the language associated with the speech audio signal) and encode it or compress it in any suitable manner.

In some embodiments the encoder 401 comprises a multiplexer configured to combine or multiplex the encoded audio signals and/or the metadata generated by the encoder prior to being transmitted.

The user 1 device 101 furthermore is configured to control the transmission of the encoded bitstream. In some embodiments the user 1 device 101 comprises a transmitter configured to transmit the bitstream 402.

The network real-time language translator (RTLT) 403 is configured to receive the bitstream comprising the encoded speech audio signal 400 in a first language, decode speech audio signal 400 in a first language, translate the speech audio signal 400 in a first language into a speech audio signal in a second language, encode the speech audio signal in the second language and combine the encoded speech audio signal 400 in the first language and speech audio signal in the first language and output an encoded bitstream 404 comprising the encoded original and translation audio signals. The network real-time language translator (RTLT) 403 may be implemented as any known real-time translator and may be implemented on translation based software and/or hardware (for example AI or deep learning processor or processors implemented within the device). In some embodiments the network RTLT server 403 is configured to encode at least the speech audio signal in the second language and re-packetize the audio for transmission. Thus in some embodiments one or two speech audio signal streams are sent to the decoder.

The user 2 device 105 may comprise a (IVAS) decoder 405. The (IVAS) decoder 405 is configured to receive the bitstream 404 and decode (and render) the speech audio signal 410 in a first language and speech audio signal 411 in a second language for spatial audio presentation. The user 2 device 105 can be thus be configured to hear the original audio and the translation audio signals.

Figure 4B:
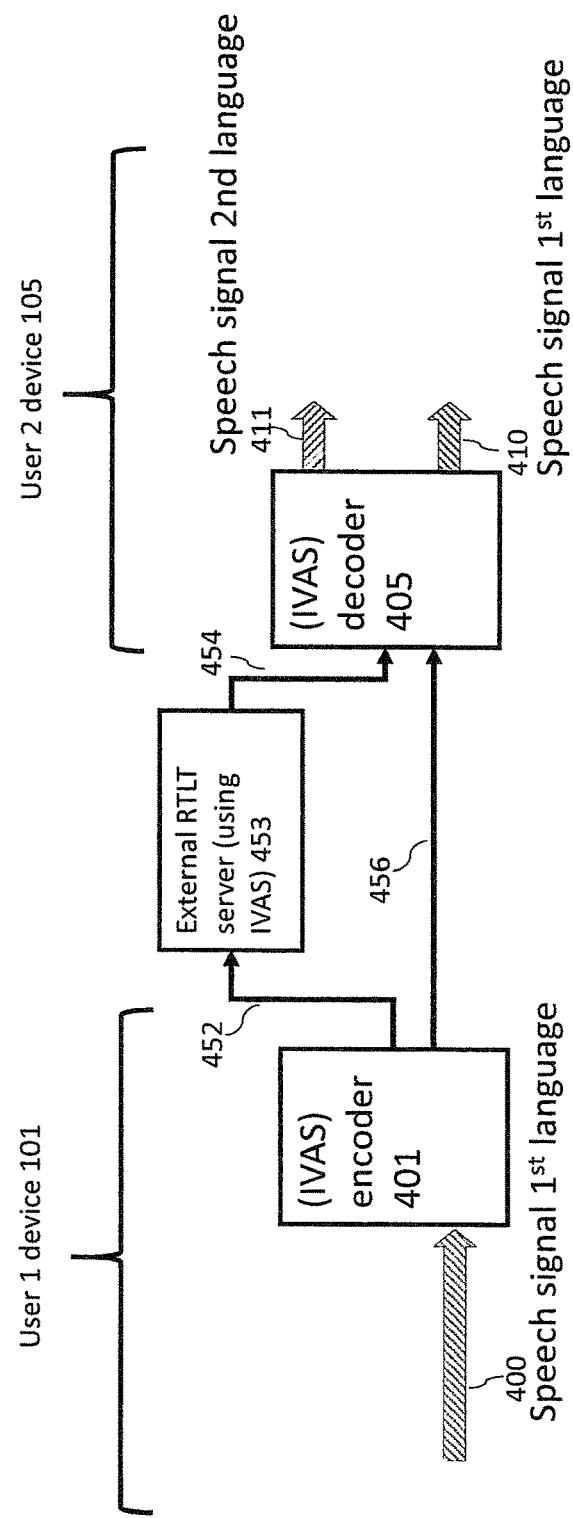

With respect to FIG. 4b is shown a further example where the difference between this example and the examples in FIGS. 3 and 4a is the decoding and rendering. The system as shown in FIG. 4b differs from that shown in FIG. 3 in that the RTLT is not a local (in other ways located within the user device) RTLT but is an external RTLT server 453. Furthermore the system as shown in FIG. 4b differs from that shown in FIG. 4a in that the encoder 401 is configured to output the bitstream comprising the speech audio signal in the first language to the RTLT server 435 in bitstream connection 452 and to the decoder 405 in a bitstream connection 456. The RTLT server 453 is configured to output a bitstream comprising the speech audio signal in a second language and the decoder is configured to receive the bitstream 454 comprising the speech audio signal in the second language separate from the bitstream 456 comprising the speech audio signal in the first language from the encoder 401.

In the examples shown in FIGS. 3, 4a, and 4b the communication is shown in one direction only, the transmission of the translated audio for the second user can be implemented (by the addition of a further local RTLT at the user 2 device 105 in the example shown in FIG. 3 and by the use of the network or external RTLT servers in the examples shown in FIGS. 4a and 4b). Presentation of at least some of the translated speech by user 1 can furthermore happen also for user 1 in some implementations. In some embodiments the RTLT functionality can be asymmetrical, i.e., the RTLT service (local, network or external) can be utilized and/or a connection to it can be obtained in one direction only. Additionally in some embodiments the RTLT functionality for various parties in a system may be implemented at different RTLT locations. Thus for example the translation from a user 1 device to a user 2 device may be implemented on the user 1 device whereas the translation from the user 2 device to the user 1 device may be implemented using an external or network RTLT server.

In some embodiments the external RTLT or network RTLT may be implemented on the user 2 device (in other words the translation is performed on the 'listeners' device).

The benefits of the system of FIG. 3 over the systems of FIGS. 4a and 4b relate to
1) a reduced delay between the original speech ($1^{st}$ language) and the translation ($2^{nd}$ language), and
2) user control.

The delay reduction happens for two reasons. Firstly, the local RTLT can in some implementations bypass at least some audio processing (that may introduce delay) that the regular IVAS input will be subject to. This can relate, for example, to equalization of the microphone signal(s) and so on. Such processing may be bypassed for the RTLT input because the output from the RTLT is a synthetic speech which can be automatically controlled. The RTLT input thus need not sound optimal to a human listener. Secondly, there is no additional decoding/encoding delay in the path. This is shown by comparing the high-level block diagrams of FIGS. 3 and 4a and 4b, where an IVAS processing operation is known to introduce delay for the signal. Furthermore, control over the features is allowed with encoder-side operation and in-band signalling. This will become apparent for the use cases other than RTLT as discussed later.

In some embodiments the at least two language audio signals (the speech audio signal in the first language, the speech audio signal in the second language and so on) are treated by the encoder as at least two separate audio objects. In such embodiments an audio-object is defined for at least one of the at least two audio objects and this definition (for example location, direction, distance, the 'coherence' of the audio object or relative width of the audio object) can be provided by the encoder as metadata (and can be defined by a suitable user interface input, or by some automatic or semi-automatic determination).

In some embodiments a first audio object associated with the speech audio signal in the first language and a second audio object associated with the speech audio signal in the second language are implemented. In such embodiments the second audio object is defined as an alternative for a first audio object. In some embodiments both audio objects are transmitted to the receiver/decoder where a user interface is provided to the receiving user to control the playback. In such embodiments the user of the receiving device can be configured to control via the user interface whether to play back both or just one of the audio objects.

In some embodiments both audio objects are transmitted to the receiver where a user interface can be provided to the receiving user to control the playback. In such embodiments the receiving user may be configured to control via the user interface the decoder or renderer to switch the playback between the audio objects with one audio object at a time being rendered to the user.

In some embodiments the at least two language audio signals (the speech audio signal in the first language, the speech audio signal in the second language and so on) are treated by the encoder as at least one channel-based audio (e.g., 5.1) or scene-based audio (e.g., MASA—Metadata-assisted spatial audio or Ambisonics) and at least one audio object at the encoder input.

In such embodiments an audio-object "role" is defined for the at least one audio object and provided as metadata (or, e.g, via command line).

In some embodiments a first audio object is associated with the speech audio signal in the first language and a second audio object is associated with the speech audio signal in the second language are implemented. In such embodiments the second audio object is defined as an alternative for a first audio object. In some embodiments both audio objects are transmitted to the receiver/decoder where a user interface is provided to the receiving user to control the playback. In such embodiments the user of the receiving device can be configured to control via the user interface whether to play back both or just one of the audio objects. In some embodiments both audio objects are transmitted to the receiver where a user interface can be provided to the receiving user to control the playback. In such embodiments the receiving user may be configured to control via the user interface the decoder or renderer to switch the playback between the audio objects with one audio object at a time being rendered to the user.

In some embodiments the at least two language audio signals (the speech audio signal in the first language, the speech audio signal in the second language and so on) are treated by the encoder as at least two channel-based audio (e.g., 5.1) or at least two scene-based audio (e.g., MASA or Ambisonics) or a suitable combination thereof. In these embodiments a "role" is defined for at least one spatial audio input and provided as metadata (or, e.g, via command line).

In some embodiments a first audio channel or scene associated with the speech audio signal in the first language and a second audio channels or scene associated with the speech audio signal in the second language are implemented. In such embodiments the second audio channels or scene are defined as an alternative for the first audio channels or scene. In some embodiments both are transmitted to the receiver/decoder where a user interface is provided to the receiving user to control the playback. In such embodiments the user of the receiving device can be configured to control via the user interface whether to play back both or just one.

In some embodiments both sets of channels or scenes are transmitted to the receiver where a user interface can be provided to the receiving user to control the playback. In such embodiments the receiving user may be configured to control via the user interface the decoder or renderer to switch the playback between the set of channels or scenes associated with the speech audio signal in the first language and the set of channels or scenes associated with the speech audio signal in the second language one at a time being rendered to the user.

In some embodiments because of the processing delay the at least one RTLT language audio signal (or scene or audio signals) trails the at least one original language audio signal (or scene or audio signals). In other words, the at least one RTLT language audio signal is delayed by at least the time it takes to begin the translation (e.g., by inputting at least one word to be translated). In addition, the at least one RTLT language audio signal may have a different length (overall duration) than the at least one original language audio signal. This is because a word/sentence/utterance can have very different length/duration in two different spoken languages (depending also at least in part on the accuracy of the translation). In some embodiments the system may signal this information, e.g., for user-control purposes. While the duration of an active voice passage by a real user can be calculated only after the end of the passage (with ambiguities relating to exact start and end of active signal, for example, due to presence of background noise, breathing noise and so on), the length of a synthesized signal ("computer speech") can be pre-calculated before the end of the passage, and the active portion can be defined without ambiguities such as breathing, background noise, etc.

Thus in some embodiments a local signal activity determination, for example a voice activity detection (VAD) operation, is performed on at least one first audio track. Based on the activity detection and in some embodiments an indication from the audio processing generating the at least one second language audio signals an information/parameter indicating an offset between the first audio channels or scene associated with the speech audio signal in the first language and the second audio channels or scene associated with the speech audio signal in the second language is generated and transmitted. In addition in some embodiments there can be determined and transmitted information/parameters to indicate an end-time offset and/or duration of the at least one second language audio signal (relative to the at least one first language audio signal).

In some embodiments the RTLT processing is configured to determine and indicate the delay between the first audio channels or scene associated with the speech audio signal in the first language and a second audio channels or scene associated with the speech audio signal in the second language and stream this to the decoder.

In some embodiments the RTLT processor is configured to determine and transmit parameters indicating the duration of the second audio channels or scene associated with the speech audio signal in the second language (the translated synthetic audio track).

In some embodiments the RTLT processor is configured to generate and transmit only stream end-time offset/duration information.

An example of an implementation for signalling of the end-time offset/duration information is shown with respect to the following table.

| Code  | 0         | (1)00            | (1)01             | (1)10              | (1)11          |
|-------|-----------|------------------|-------------------|--------------------|----------------|
| Value | No update | 250 + frames     | 51-250 frames     | Up-to 50 frames    | Segment end    |

In this example practical numbers for the audio codec and user interface (UI) are considered based on the above discussion. The average speed speech (with doubling of speed between the lower and upper bound) with a typical sentence or utterance length can result in a secondary audio track trailing by as little as about 1 second or by as much as 10 seconds or more. For a typical conversational audio codec, such as IVAS, operating on a 20-ms frame, this corresponds to a delay of about 50-500 frames. When in-band signalling is used, it will typically be frame-by-frame or at certain update intervals. In the table shown above a code signalling is shown that can be frame-by-frame or part of a specific update frame. It is understood that frame-by-frame signalling of the current information may be wasteful and thus embodiments may be configured not to send the information in each frame.

In the example above, a first bit indicates update (0/1). This is followed by two bits that provide information on the number of remaining frames (if an update is made the first bit is 1). It is noted that a "no update" can be firstly provided when the length of the segment is not yet known. A "no update" can be also used to conserve bit rate. A "segment end" signal may not be necessary in some embodiments. In some embodiments the ending of the segment can be separately signalled, or, for example an activity detection can be used to deduce that there is no audio signal content remaining. In some embodiments a counter can be used to count frames since last known update frame. The duration of the content track can be useful for signal processing in the rendering (for example for memory updates, complexity reductions) and also for a user interface (UI) that may receive information from the decoder/renderer and provide control information at least to the renderer (and in some implementations also to be signalled to the transmitting end's encoder).

Different values and implementations are possible. For example, the audio signals or track which are defined above as the speech audio signal 302 in a second language or the secondary track may be intended for other use cases than RTLT. In some embodiments, the duration range may differ from those discussed above.

In some embodiments reference information (such as active passage timing information) on the speech audio signal in a first language (the at least one original language track) can be transmitted.

In some embodiments, based on a recipient's local voice activity detection (VAD), a request can be generated and transmitted such as a codec mode request (CMR) or, e.g., an alternative audio track request (ATR). Specifically, the mode request may relate to stopping the transmission of the currently active secondary alternative (language) audio(s).

Based on recipient's UI indication, in some embodiments a signalling for a codec mode request (CMR) can be created. Specifically, the mode request relates to stopping the transmission of the currently active secondary alternative (language) audio(s).

Also in some embodiments based on a recipient's UI indication, a signalling for codec mode request (CMR) can be created. Specifically, the mode request relates to re-starting the transmission of the currently active or previous secondary alternative (language) audio(s). "Currently active" in these embodiments can be defined in terms of stream time offset and end-time synchronization signalling.

In some embodiments the speech audio signal in the second language is inserted/mixed into a MASA spatial bed prior to encoding. For example, at least one MASA input provides the original audio and at least one audio object provides the translation. An audio mixing is performed within the IVAS encoder, where the new downmixed MASA transport channel(s) replace the original MASA transport channel(s) and the at least one translated audio track, and the translated audio is represented by a second audio direction. If the MASA metadata already contains two directions, the representation can be extended to three directions within the codec, or the translated audio direction can replace the second direction. In some embodiments a signalling flag is sent to the decoder indicating this operation.

Thus for example in some embodiments a translated speech audio signal in the second language is inserted/mixed into a MASA spatial bed prior to encoding. For example, at least one MASA input is the first audio channels or scene associated with the speech audio signal in the first language and the speech audio signal (or audio channels or scene) in the second language is provided as at least one audio object. An audio mixing can then be performed within the IVAS encoder. The downmixed MASA transport channel(s) may then replace the original MASA transport channel(s) and the alternative MASA transport channel(s) replace the at least one audio object. In some embodiments the MASA metadata comprises a representation of the translated audio by a second audio direction. In some embodiments where the MASA metadata already contains two or more directions, the representation can be extended to three or more directions within the codec, or the translated audio direction can replace the second direction. In some embodiments an additional signalling flag is sent to decoder.

In some embodiments the audio signals are pre-mixed and converted into some spatial format other than MASA. For example the audio signal are converted into an Ambisonics format. In such embodiments the translation audio signal (track) spatial position within the sound scene is then signalled to the decoder.

In some embodiments the pre-mixing is carried out outside the encoder.

In some embodiments the use of separate input audio 'tracks' comprising one or more audio signals may be used to provide additional functionality.

Previously, audio focus via IVAS has been discussed in patent applications GB1811847.1 and PCT/EP2018/079980. According to the patent applications GB1811847.1 and PCT/EP2018/079980, an audio-focus object may be delivered alongside a main spatial signal. These objects have a spatial position relative to the listening position and the sound scene (spatial bed). In such a manner a particular audio signal that can be mixed with the spatial bed signal according to the spatial position given by its direction (or coordinates) is provided. The audio-focus object intensifies the spatial sound source in the given direction. It can be provided by a UI where the listener is able to, e.g., switch the audio-focus effect on/off or alter its strength, i.e., apply a source-specific volume control using the audio-focus object. One use case for an audio focusing is capturing a speaker or talker in a noisy ambient environment. The ambience may be interesting for the listener, however the talker may be difficult to hear due to background signal level. By means of audio focus, the listener can control the volume balance and hear the talker better while still also hearing the ambience audio.

In the patent applications GB1811847.1 and PCT/EP2018/079980 there is described example signalling relating to the role of the audio-focus object. In some embodiments the 'secondary track' which is described in the RTLT embodiments as the speech audio signal can be defined as a further roles.

| Name | Description | Example use case |
| --- | --- | --- |
| Default (general) audio object | Fully controllable. Preferred or required to be fully separable at the decoder/renderer. | Regular audio object. Audio source than can be moved. For example, a caller voice in a spatialized teleconference. |
| Restricted audio object | Restricted control for audio object. At least some rules transmitted on the rendering. Preferred or required to be fully separable at the decoder/renderer. | Regular audio object with limitations on user control. |
| Alternative concurrent audio object | Alternative sound audio with other audio, by default play back both. Preferred or required to be fully separable at the decoder/renderer. | RTLT, AR. Audio object can be controlled by the recipient and it can, for example, be cancelled/dismissed (where the interaction can be transmitted to sender). |
| Alternative toggle (alternating) audio object | Alternative audio with other audio, by default only the "main one" is played back. Selecting the other one disables the first one. One component for a pair of audio toggles on/off. Preferred or required to be fully separable at the decoder/renderer. | Online comparison of or switching between audio sources without simultaneous playback. For example, different language tracks for AR. |
| Restricted additive audio object | Audio can be added to spatial bed based on user control. Default operation (on/off) may be signalled. Position may be fixed, i.e., it is not user controllable. | Audio-focus effect delivered using an audio object. |

In such embodiments encoder/decoder may have a generic default audio object type that represents an individual/independent sound source. For example, a conference bridge may have many upstream connections (e.g., using EVS and IVAS) and spatially render downstream scenes (using IVAS) where individual sources are represented by objects. As a specific example, an EVS upstream may be given a spatial position and sent downstream as an audio object. It is understood that a user could have full control of the spatial position and other rendering parameters (e.g., gain) for such audio object. The audio scene can be relevant with only the one audio object.

In some embodiments such an implementation may also support the use of more restricted audio objects. The more restricted objects may be defined in such a manner that at least some parameters relating to the spatial rendering of the audio object are not permitted to be amended or changed by the (receiver) user. For example, an artistic intent may relate to a spatial positioning of an audio source which the user is not allowed to change. In some embodiments the audio scene can be relevant with only the one audio object.

In some embodiments the audio scene may not be relevant with only a single audio object of certain kind. For example, a specific type of restricted audio object is an additive audio object, e.g., an audio-focus object. Such audio object can be considered as additive only, in other words it may not be delivered alone. Typically there may be other restrictions, e.g., in the case of the audio-focus objects the spatial position of the object is not freely controllable by the receiving user.

In some embodiments an alternative concurrent audio object type is a type of audio object that allows for example RTLT in a manner as described in the embodiments above. In such embodiments at least two audio objects are permitted to be presented at the same time. However, they may be considered to be alternatives and in some embodiments based on a user input may be selected or unselected (or removed/deactivated). For example, in case of RTLT operation user it could be delivered to the user an original language track and one or more translation tracks (corresponding to one or more different languages).

In some embodiments another use case example for the alternative concurrent audio object is that of embedding an augmented reality (AR) audio stream into an IVAS call.

In such embodiments. An AR use case can be summarized in the following steps:
User 1 is traveling and walks around a historic city centre;
User 1 operating a user device places a call home and describes what he sees to user 2 (recipient);
User 2 finds the historic site interesting and requests (asks) to know more;
User device used by user 1 has an augmented reality application and selects an audio story about a building they are passing;
The AR audio is input to the IVAS encoder and transmitted as an alternative audio object with offset and duration signalling relative to the main audio (user 1's voice);
The AR audio is transmitted and spatially rendered to user 2 using their user device;
User 1 hears (or sees on their device) whether user 2 continues the playback of the AR audio;
When user 2 has heard enough of the current building, they dismiss the AR audio. This is signalled to user 1;
User 1 is now able to select a next AR audio to be transmitted.

An alternative alternating audio object allows for a straightforward toggling between (typically) two audio objects in the playback. It is signalled that one audio object is a preferred (default) one, and user can switch from one to another such that activating a second one deactivates the first one and vice versa. It could be supported also a round-robin type "carousel" of more than two such audio objects. For example, in case of RTLT operation it could be delivered to the user an original language track and two translation tracks (corresponding to two different languages) between which the user may be allowed to toggle.

Some types of combinations of the roles given in the table above can be allowed. For example, an AR service could provide a voice over by means of an alternative concurrent audio object, which itself implements an alternative alternating audio object for language selection.

It is furthermore understood that a receiving user, e.g., can be transmitted an audio scene consisting of several audio objects (or audio object groups) that can have various roles independent of other audio objects (or audio object groups). For example, an audio scene delivered to a user may be created by a service such as a conference system or any other suitable service based on at least one audio input. An audio scene may include, e.g., at least two independent talkers (for example users calling from their respective homes) or at least two talkers from the same capture space (for example a shared meeting room), where each talker may be represented by at least one audio object and RTLT may be utilized. For example, each talker may be represented by means of alternative concurrent or alternative alternating audio objects. Thus, for a receiving user the audio scene may be presented such that in a first direction the user hears a first talker's speech in first language, in a second direction the user hears a second talker's speech in second language, in a third direction the user hears a first talker's speech in a third language, and in a fourth direction the user hears a second talker's speech in a fourth language. Alternatively, for a receiving user the audio scene may be presented such that the user hears a first talker's speech in first language in a first direction or a first talker's speech in a third language in a third direction, and a second talker's speech in second language in a second direction or a second talker's speech in a fourth language in a fourth direction. In the latter case, the first and the third direction may be the same direction, and the second and the fourth direction may be the same direction.

An audio-object role or type can be explicit or there can be separate metadata to accompany an audio object. For example, audio object position can be transmitted to the receiver as a binding position (that receiving user is not allowed to alter) or it can be a default position that is user-changeable. Also, there can be additional control metadata. Such metadata can indicate, e.g., priority rules or stream-dependency rules for encoding (as discussed in patent applications GB1811847.1 and PCT/EP2018/079980 or other stream-timing related information such as the time offset and duration that can be signalled for an RTLT track/object relative to a main (original language) voice track/object.

In some embodiments the audio-object role is defined as a combination of individual properties. Thus, it may be signalled, e.g., that an audio object should or must be separable at the decoder/renderer. This would define at least one property, such as 'separability' or 'degree of separability'. It may then additionally be signalled, e.g., that audio object is linked to at least a second audio object. This would define at least one additional property, and so on. For example, the role can be expressed at the audio encoder input as a list of properties or as a property matrix. In the former case, all properties pertaining to an audio object are provided individually. In the latter case, it is indicated based on a property matrix (or list) whether the audio object has each property (and if yes, its value) or not. In some embodiment a suitable combination of these approaches may be used.

In some embodiments, information determined by the user device performing the encoding and delivered and used by the decoder/renderer (and in some embodiments controlled by the UI of the device performing the decoding/rendering) is the duration of the alternative audio. This duration may be a total duration or a remainder duration.

In some embodiments there may be multiple related audio passages, for example multiple alternative concurrent audio objects. In such embodiments reference information can be transmitted. For example, in the multiple concurrent audio objects example the timing information indicating when a reference audio object can be active is transmitted.

In some embodiments where there is more than one parallel secondary track allowed signalling needs to consider this. The spatial presentation allows for simultaneous presentation of sound sources (audio tracks) such that the user can concentrate on the sound source that is at that point most critical or interesting for the receiving user. In such embodiments any wait time or delay experienced by the receiver can be diminished while switching between sound sources. For example, when user 1 (who is currently talking) hears the end or tail of the RTLT track and can therefore (before its end) 'claim the floor' and continue to talk. In some embodiments this can extend the existing RTLT track or create a further RTLT track. In this example there may be two simultaneous presentations of RTLT audio from user 1 to user 2. The first corresponds to the tail of the first segment, and the second corresponds to the newly started second segment. These can in some embodiments be presented as spatially separate.

On the other hand, while user 1 is not talking and the RTLT is still being presented, user 2 can dismiss the audio and 'claim the floor' for themselves prior to completion of the RTLT audio presentation. This would be clear to user 1 as they would hear user 2 (and their RTLT track) and from signalling and potentially audio playback modification.

In these embodiments as discussed above interaction between users is more flexible, and conversations are more natural.

In some embodiments the information may be signalled from one user device to another by use of metadata, which can in some embodiments be or include the MASA format metadata.

Figure 7A:
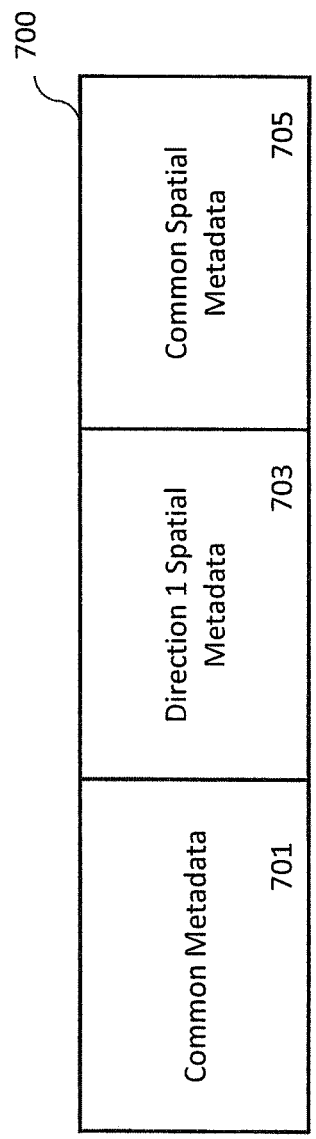
FIGS. 7a and 7b show example metadata structures according to some embodiments.

For example, as shown in FIG. 7*a*, it is shown a metadata format 700 where there is a common metadata element 701, a (MASA) metadata element with one direction per TF (time-frequency) subframe/tile and common spatial metadata 705.

Figure 7B:
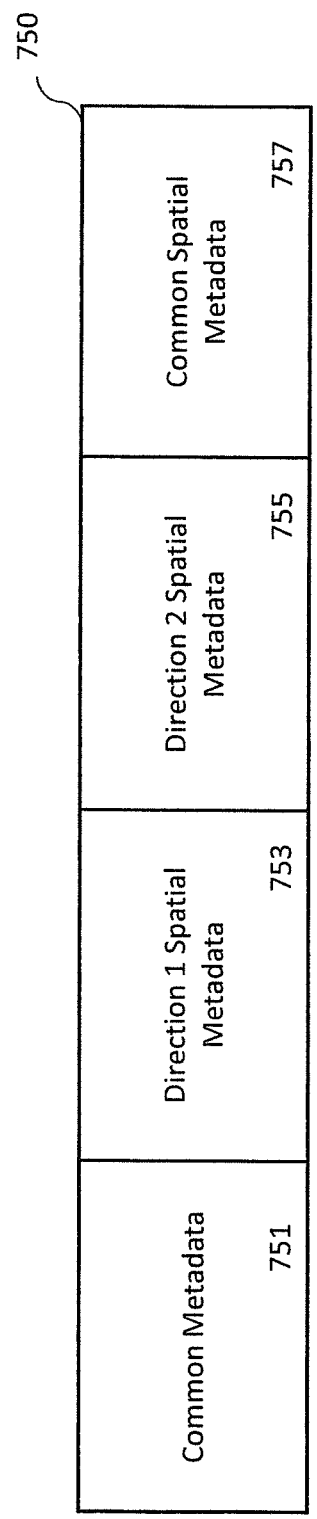

Similarly, FIG. 7*b* shows a metadata format 750 which comprises a common metadata element 701, a first direction per TF (time-frequency) subframe/tile metadata element 753, a second direction per TF (time-frequency) subframe/tile metadata element 755 and common spatial metadata 757 element. In both of these example formats the common metadata may include information which defines the number of channels and the channel description (this can be called, e.g., Channel audio format parameter) as well as defining the number of directions.

The directional metadata in some embodiments may be in the following format

| Field | Bits | Description |
| --- | --- | --- |
| Direction index | 16 | Direction of arrival of the sound at a time-frequency parameter interval. Spherical representation at about 1-degree accuracy. Range of values: "covers all directions at about 1° accuracy" |
| Direct-to-total energy ratio | 8 | Energy ratio for the direction index (i.e., time-frequency subframe). Calculated as energy in direction/total energy. Range of values: [0.0, 1.0] |
| Spread coherence | 8 | Spread of energy for the direction index (i.e., time-frequency subframe). Defines the direction to be reproduced as a point source or coherently around the direction. Range of values: [0.0, 1.0] |
| Distance | 8 | Distance of the sound originating from the direction index (i.e., time-frequency subframes) in meters on a logarithmic scale. Range of values: for example, 0 to 100 m. |

The common spatial metadata may be dependent on (the number of) direction(s). Examples of common spatial metadata may be:

| Field | Bits | Description |
| --- | --- | --- |
| Diffuse-to-total energy ratio | 8 | Energy ratio of non-directional sound over surrounding directions. Calculated as energy of non-directional sound/total energy. Range of values: [0.0, 1.0] (Parameter is independent of number of directions provided.) |
| Surround coherence | 8 | Coherence of the non-directional sound over the surrounding directions. Range of values: [0.0, 1.0] (Parameter is independent of number of directions provided.) |
| Remainder-to-total energy ratio | 8 | Energy ratio of the remainder (such as microphone noise) sound energy to fulfil requirement that sum of energy ratios is 1. Calculated as energy of remainder sound/total energy. Range of values: [0.0, 1.0] (Parameter is independent of number of directions provided.) |

These formats are examples only and the information may be signalled in any suitable manner and may thus include new parameters or, e.g., remove the Distance parameter.

In some embodiments the coding and decoding within a codec, and the codec capability can be configured based on negotiation taking place to establish the audio call between the at least two parties. As such in some embodiments such negotiation can explicitly include these features, e.g., RTLT and/or audio focus features (or any other suitable features), or it can implicitly allow for such features. For example, the audio-object roles and their time-dependency signalling can be used in various ways in different applications and services.

In addition to RTLT and AR applications the implementation of a secondary or further (or alternatives) concurrent audio track can be used for any suitable application or use case. These include:
Real-time language translation (RTLT)
Augmented reality (AR)
Advertisements
For example, contextually relevant ads selected based on a local speech analysis.

Alerts
For example, a network service inserts into downstream an audio object that provides a local alert (based on user's location/cell).

Figure 8:
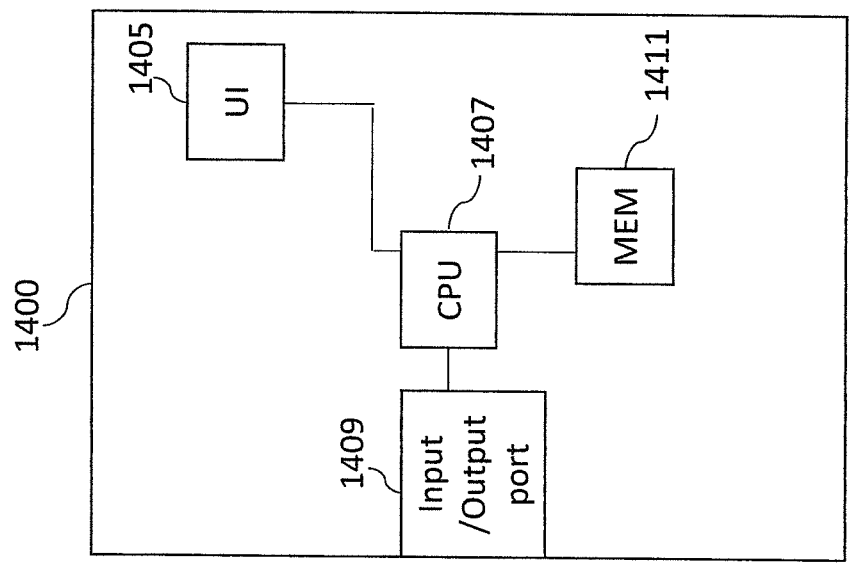
FIG. 8 shows an example device suitable for implementing the apparatus shown.

With respect to FIG. 8 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including computer program code, the at least one memory and the computer program code configured to, with the at least one processor cause the apparatus to:
   receive a primary track comprising at least one audio signal;
   receive at least one secondary track, each of the at least one secondary track comprising at least one audio signal, wherein the at least one secondary track is based on the primary track;
   decode and render the primary track using spatial audio decoding; and
   decode and render, based on a translation delay time, the at least one secondary track using spatial audio decoding.

2. The apparatus as claimed in claim 1, wherein the primary track comprising at least one audio signal comprises at least one of:
   at least one captured microphone audio signal;
   at least one transport audio signal and spatial metadata generated based on a spatial analysis of at least one captured microphone audio signal;
   an audio object comprising at least one audio signal and spatial metadata; and
   an ambisonics format audio signal based on a spatial analysis of at least one captured microphone audio signal.

3. The apparatus as claimed in claim 1 wherein the primary track comprising at least one audio signal comprises at least one speech component in a first language.

4. The apparatus as claimed in claim 3, wherein the at least one secondary track is based on the primary track is at least one audio signal comprising at least one speech component in a second language.

5. The apparatus as claimed in claim 1, wherein the primary track comprising at least one audio signal comprises at least one speech component in a first language and the at least one secondary track based on the primary track is at least one audio signal associated with a location of the at least one audio signal.

6. The apparatus as claimed in claim 4, where in the apparatus is further caused to receive information parameters associated with the at least one secondary track and/or the primary track, wherein the information parameters associated with the at least one secondary track and/or the primary track is at least one of:
   a primary track reference time;
   a primary track initial talk time;
   a primary track element length;

a secondary track to primary track offset;
a secondary track to primary track delay; and
a secondary track element length.

7. The apparatus as claimed in any of claim 1, wherein the apparatus is further caused to receive at least one user input, wherein the apparatus caused to decode and render the primary track and the at least one secondary track using spatial audio decoding is further caused to decode and render the primary track and the at least one secondary track based on the user input to modify at least one of the primary track and the at least one secondary track.

8. The apparatus as claimed in claim 7, wherein the apparatus caused to decode and render the primary track and the at least one secondary track based on the user input to modify at least one of the primary track and the at least one secondary track is caused to perform at least one of:
   modify a rendering position or location or orientation of an audio object associated with at least one of the primary track and the at least one secondary track;
   modify a volume of the primary track and the at least one secondary track; and
   select for rendering at least one of the primary track and the at least one secondary track.

9. The apparatus as claimed in any of claim 1, wherein the apparatus is further caused to receive at least one user input wherein the at least one user input is configured to control an encoder configured to encode at least one of the primary track and the at least one secondary track.

10. The apparatus as claimed in any of claim 1, wherein the primary and/or at least one secondary track comprises one of:
   an enhanced voice system encoded multichannel audio signal; and
   an Immersive Voice and Audio Services multichannel audio signal.

11. An apparatus comprising at least one processor and at least one memory including computer program code, the at least one memory and the computer program code configured to, with the at least one processor cause the apparatus to:
   obtain a primary track comprising at least one audio signal; and
   encode, based on a translation delay time, the primary track using spatial audio encoding, wherein the primary track is associated with a secondary track generated based on the primary track and further encoded using spatial audio encoding.

12. The apparatus as claimed in claim 11, wherein the primary track comprising at least one audio signal comprises at least one of:
   at least one captured microphone audio signal;
   at least one transport audio signal and spatial metadata generated based on a spatial analysis of at least one captured microphone audio signal;
   an audio object comprising at least one audio signal and spatial metadata;
   an ambisonics format audio signal based on a spatial analysis of at least one captured microphone audio signal.

13. The apparatus as claimed in claim 11, wherein the primary track comprising at least one audio signal comprises at least one speech component in a first language.

14. The apparatus as claimed in claim 13, wherein the apparatus is further caused to generate the at least one secondary track, each of the at least one secondary track comprising at least one audio signal comprising at least one speech component in a second language.

15. The apparatus as claimed in claim 11, wherein the primary track comprising at least one audio signal comprises at least one speech component in a first language and the apparatus is further caused to generate the at least one secondary track, the at least one secondary track being at least one audio signal associated with a location of the at least one audio signal.

16. The apparatus as claimed in claim 14, where in the apparatus is further caused to generate information parameters associated with the at least one secondary track and/or the primary track, wherein the information parameters associated with the at least one secondary track and/or the primary track is at least one of:
   a primary track reference time;
   a primary track initial talk time;
   a primary track element length;
   a secondary track to primary track offset;
   a secondary track to primary track delay; and
   a secondary track element length.

17. The apparatus as claimed in claim 14, wherein the apparatus is further caused to receive at least one user input, wherein the apparatus caused to obtain the primary track and caused to generate the at least one secondary track is further caused to modify at least one of the primary track and the at least one secondary track based on the user input.

18. The apparatus as claimed in claim 17, wherein the apparatus caused to modify at least one of the primary track and the at least one secondary track based on the user input is caused to perform at least one of:
   modify a spatial position or location or orientation of an audio object associated with the primary track and the at least one secondary track;
   modify a volume of the primary track and the at least one of the at least one secondary track; and
   select at least one of the primary track and the at least one of the at least one secondary track.

19. The apparatus as claimed in claim 11, wherein the apparatus is further caused to:
   receive at least one user input, wherein the at least one user input is configured to encode the primary track using spatial audio encoding.

20. A system comprising:
   the apparatus as claimed in claim 11; and
a further apparatus comprising means-configured to:
   receive the primary track;
   generate at least one secondary track based on the primary track; and
   encode the at least one secondary track using spatial audio encoding.

* * * * *

UNITED STATES PATENT AND TRADEMARK OFFICE
CERTIFICATE OF CORRECTION

PATENT NO. : 12,067,992 B2
APPLICATION NO. : 17/600466
DATED : August 20, 2024
INVENTOR(S) : Lasse Laaksonen et al.

Page 1 of 1

It is certified that error appears in the above-identified patent and that said Letters Patent is hereby corrected as shown below:

In the Claims

In Column 32, Line 59, Claim 6, delete "where in" and insert -- wherein --, therefor.

In Column 33, Line 4, Claim 7, delete "in any of" and insert -- in --, therefor.

In Column 33, Line 24, Claim 9, delete "in any of" and insert -- in --, therefor.

In Column 33, Line 29, Claim 10, delete "in any of" and insert -- in --, therefor.

In Column 34, Line 16, Claim 16, delete "where in" and insert -- wherein --, therefor.

In Column 34, Line 53, Claim 20, delete "apparatus comprising means-" and insert -- apparatus --, therefor.

Signed and Sealed this
Twenty-second Day of April, 2025

Coke Morgan Stewart
*Acting Director of the United States Patent and Trademark Office*